United States Patent [19]

Mortimore

[11] Patent Number: 5,175,779
[45] Date of Patent: Dec. 29, 1992

[54] METHOD OF FORMING AN OPTICAL FIBRE COUPLER AND A COUPLER SO FORMED

[75] Inventor: David B. Mortimore, Ipwich, United Kingdom

[73] Assignee: British Telecommunications public limited company, Great Britain

[21] Appl. No.: 743,317

[22] PCT Filed: Mar. 20, 1990

[86] PCT No.: PCT/GB90/00419
§ 371 Date: Aug. 20, 1991
§ 102(e) Date: Aug. 20, 1991

[87] PCT Pub. No.: WO90/11540
PCT Pub. Date: Oct. 4, 1990

[30] Foreign Application Priority Data

Mar. 20, 1989 [GB] United Kingdom ............... 8906327

[51] Int. Cl.⁵ .............................................. G02B 6/26
[52] U.S. Cl. .............................................. 385/43
[58] Field of Search ................ 385/42, 43, 48, 50, 385/121; 65/4.3

[56] References Cited

U.S. PATENT DOCUMENTS 4,392,712  7/1983  Ozeki .................... 385/50

FOREIGN PATENT DOCUMENTS 0212954  3/1987  European Pat. Off.
87/00934  2/1987  PCT Int'l Appl.

OTHER PUBLICATIONS

Patent Abstracts of Japan, vol. 12, No. 363, 29 Sep. 1988, & JP A 63-115112 (Sumitomo Electric Ind Ltd) 19 May 1988.
Patent Abstracts of Japan, vol. 12, No. 383, 13 Oct. 1988, & JP A 63-129307 (Sumitomo Electric Ind Ltd) 1 Jun. 1988.
Patent Abstracts of Japan, vol. 13, No. 9, 11 Jan. 1989, & JP A 63-217314 (Nippon Telegr & Teleph Corp) 9 Sep. 1988.
Journal of the Optical Society of America, vol. 62, No. 11, Nov. 1972 "Coupled-Mode Theory for Optical Fibers", Snyder, pp. 1267-1277.

Primary Examiner—John D. Lee
Assistant Examiner—John Ngo
Attorney, Agent, or Firm—Nixon & Vanderhye

[57] ABSTRACT

Six secondary optical fibres (20) are located about and parallel to a central optical fibre (21) by a capillary tube (22) to form a fibre bundle which is then formed into a fused, tapered coupler in which the tapering is stopped when the proportions of light coupled out of the central fibre (21) at 1.3 and 1.53 μm are first equal. The fusion process can provide sufficient fusion between the central fibre and each secondary fibre to provide a 1 to (n+1) coupler where n is the number of secondary fibres. This method provides a coupler which is wavelength-flattened between 1.3 and 1.53 μm using similar fibres.

19 Claims, 22 Drawing Sheets

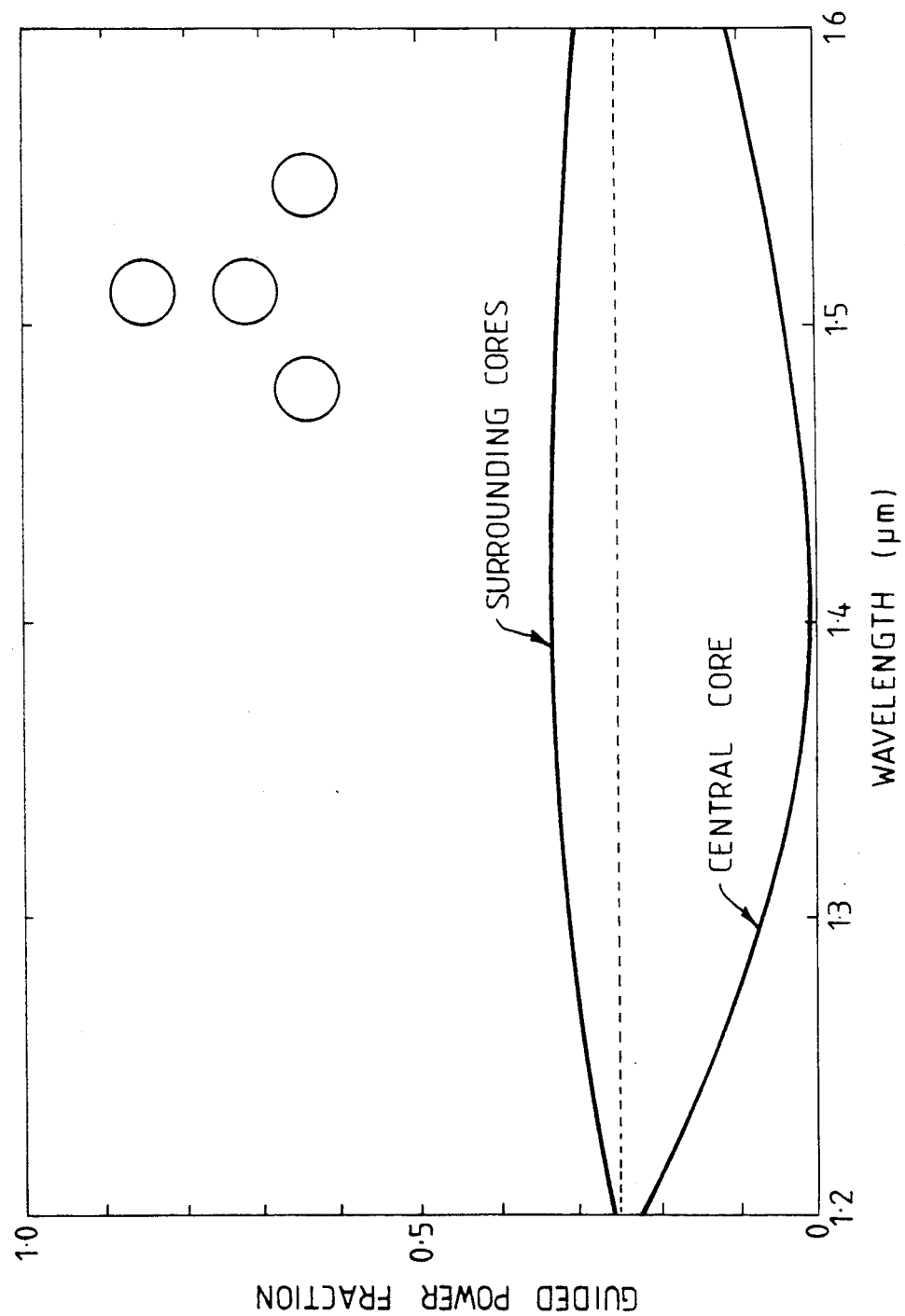

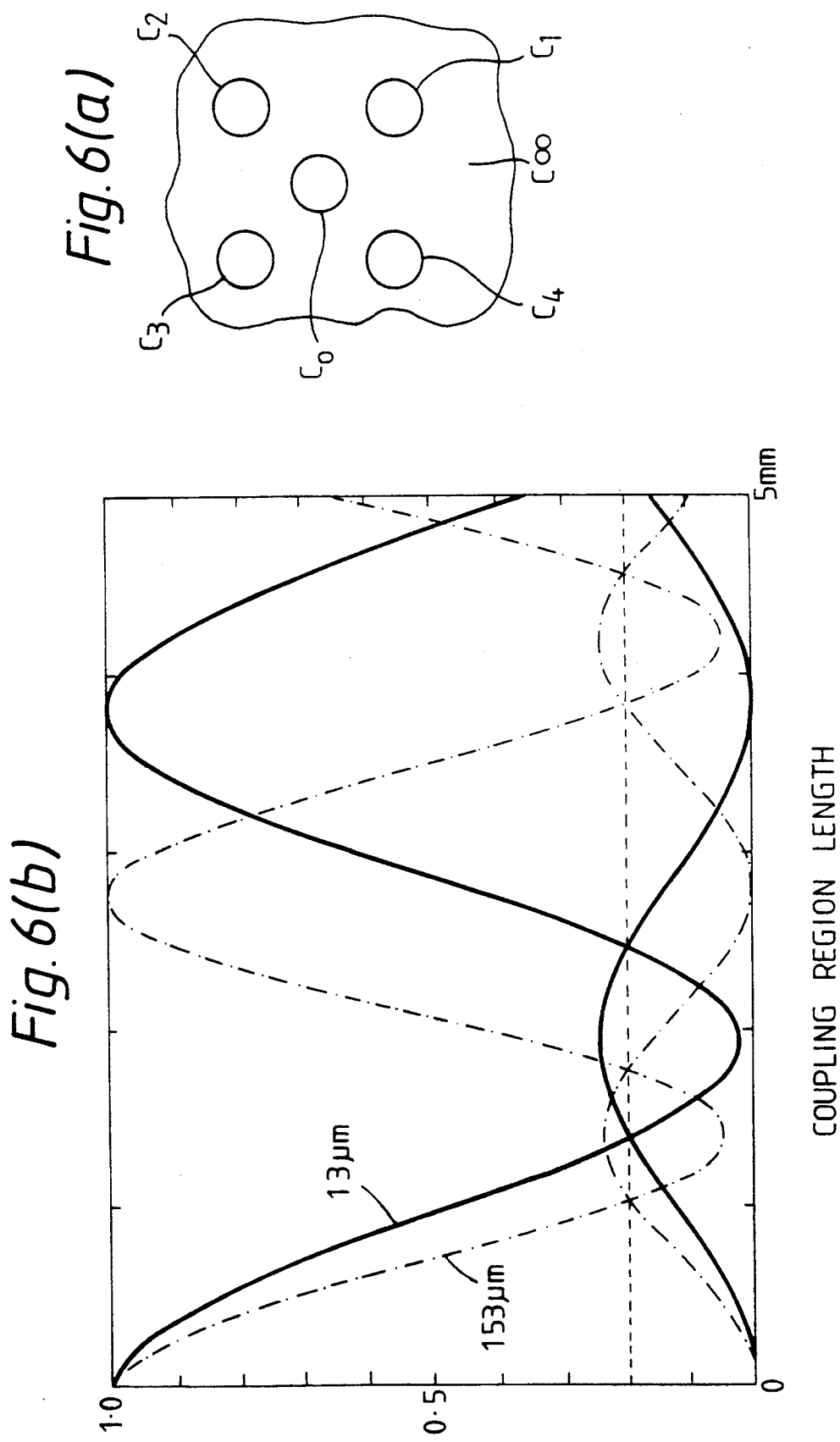

NORMALISED FUSED WIDTH, W = x/d

METHOD OF FORMING AN OPTICAL FIBRE COUPLER AND A COUPLER SO FORMED

This invention relates to methods of forming optical fibre couplers and couplers so formed.

In this specification, the term "optical" is intended to refer to that part of the electromagnetic spectrum which is generally known as the visible region together with those parts of the infrared and ultraviolet regions at each end of the visible region which are capable of being transmitted by dielectric optical waveguides such as optical fibres.

1×N single-mode star couplers are attractive components for use in future optical networks which rely on passive splitting of optical signals from a central station to many outstations. These networks will, in all probability, be wavelength multiplexed with wavelengths covering a broad wavelength range so it is important that star couplers are not only available but are also wavelength insensitive to ensure equal signal distribution to the outstations. Although wavelength-flattened couplers may be fabricated by knitting together many 2×2 wavelength flattened couplers of the kind disclosed in the applicant's patent U.S. Pat. No. 4,798,436, the resulting devices tend to be large and relatively complex while 1×N devices made by the method of the above patent requires the use of fibres having dissimilar propagation constants and consequently the need for controlled pre-tapering etching or use of different optical fibres.

Japanese patent application 03-2173141(A) describes the production of an optical branching filter in which a bundle of optical fibres is inserted into a glass tube having an inside wall layer of lower refractive index and melting point. This assembly is then heated and drawn until the central fibre and one of the surrounding fibres propagate the same optical power from an optical source coupled to the central fibre on the other side of the filter. This, however, provides an equal 1:n split at one wavelength only.

According to the present invention a method of forming an optical fibre coupler includes the steps of locating two or more secondary optical fibres about a central optical fibre to form a fibre bundle such that all the secondary fibres are similarly disposed with respect to every one of the other fibres; and forming a fused, tapered coupler from the fibre bundle the tapering being stopped when the proportions of light coupled out of the central fibre at two distinct predetermined frequencies are first equal.

The fibres may be located within a capillary tube to ensure the required geometry is maintained during the usual heating and pulling of the fibre bundle to form the tapered structure. Alternatively, they can be located by holes in a support member such as a glass cylinder.

To ensure equal coupling of light into each of the secondary fibres, each secondary fibre must be in the same position relative to all the other fibres (where mirror symmetric disposition are to be regarded as the same). This is readily achieved by arranging the secondary fibres equidistantly spaced in a ring about the central fibre. As will be discussed in more detail below, it may be advantageous to reduce the coupling into the secondary fibres. It has been found that this can be obtained, in the case where there are an even number of secondary fibres, by grouping the secondary fibres in pairs. Each of the paired fibres will be in mirror symmetric dispositions relative to all the other fibres and so will all experience the same coupling from the central fibre, but the asymmetric disposition round the fibre reduces the amount of coupling.

The point at which to stop tapering may be determined by injecting into the central fibre a light signal at one or both of the distinct frequencies and monitoring the light exiting the central fibre or one or more secondary fibres. If the coupler manufacturing process is sufficiently consistant it may be possible to monitor only one frequency (which may or may not be one of the distinct frequencies) and stop tapering when the monitored output reaches a level which it is known from previous coupler manufacture corresponds to length at which the light coupled out of the central fibre at the two distinct predetermined frequencies is first equal.

A method of forming a coupler according to the present invention and its principle of operation will be explained in more detail by reference to embodiments which are exemplary only and with reference to the accompanying drawings of which FIG. 1 is a diagramatic cross-sectional view of an optical fibre array in an infinite cladding material which serves as a model for a theoretical analysis of a coupler according to present invention;

FIGS. 2(a) and 2(b) are a diagrammatic representation of a three-core coupler and a graph of the coupling ratio of such a coupler as a function of coupling length at 1.3 and 1.53 μm, respectively;

FIG. 3 is a diagramatic representation of the three-core coupler of FIG. 2(a) configured as a bi-directional 1×2 optical coupler;

FIGS. 4(a), and 4(b), are a diagramatic representation of a four-core coupler and a graph of the coupling ratio of such a coupler as a function of coupling length at 1.3 and 1.53 μm;

FIG. 5 is graph of the wavelength response of the coupler of FIG. 4(a) for a coupling length of 1.87 mm;

FIGS. 6(a) and 6(b), are a diagramatic representation of a five-core coupler and a graph of the coupling ratio of such a coupler as a function of coupling length at 1.3 and 1.53 μm;

FIGS. 7(a) and 7(b) are a diagramatic representation of a five-core coupler with the secondary cores arranged in pairs and a graph of the coupling ratio of such a coupler as a function of coupling length at 1.3 and 1.53 μm;

FIGS. 8(a) and 8(b) are a diagramatic representation of a six-core coupler and a graph of the coupling ratio of such a coupler as a function of coupling length at 1.3 and 1.53 μm;

FIG. 9, is graph of the wavelength response of the coupler of FIG. 8(a);

FIGS. 10(a) and 10(b) are a diagramatic representation of a seven-core coupler and a graph of the coupling ratio of such a coupler as a function of coupling length at 1.3 and 1.53 μm, respectively;

Figure 14:
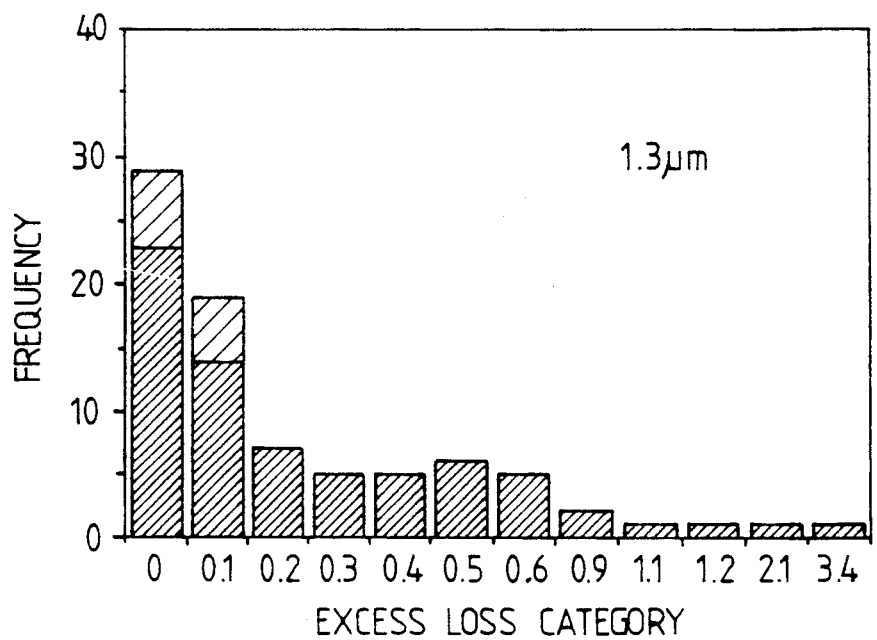
FIGS. 14 and 15 are histograms showing the excess loss at 1.3 μm and 1.53 μm, respectively, for a group of 1×7 couplers according to the present invention.
Figure 15:
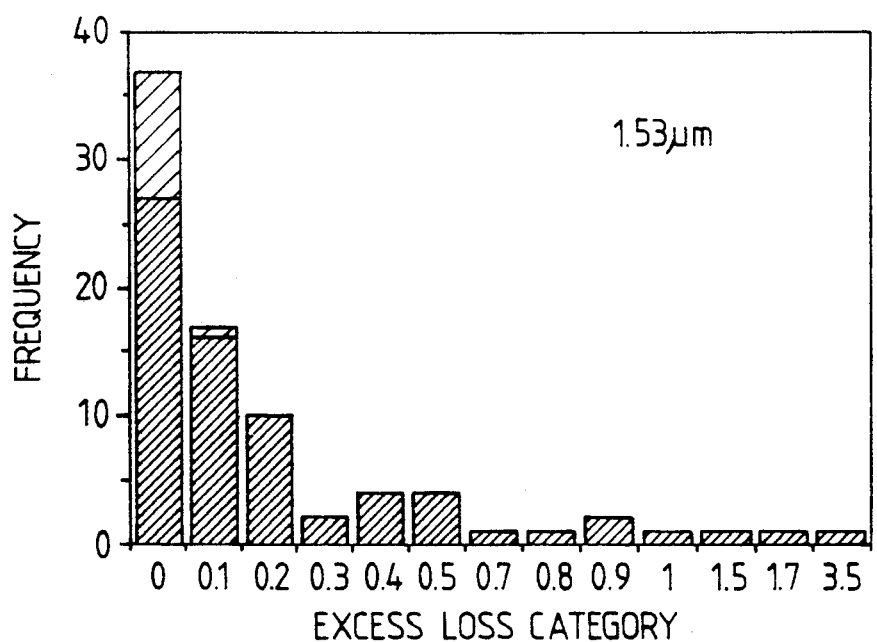
Figure 16:
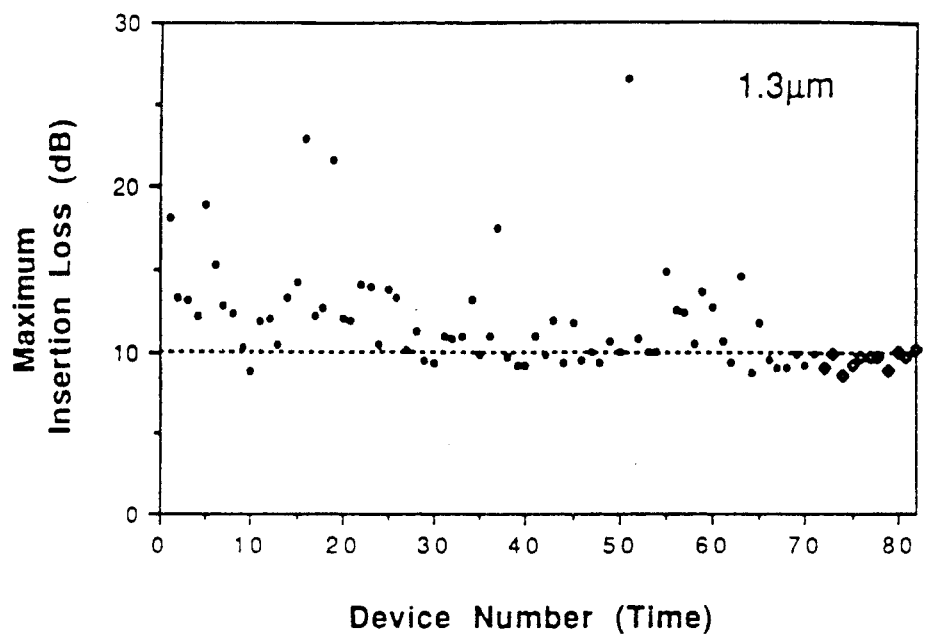
Figure 17:
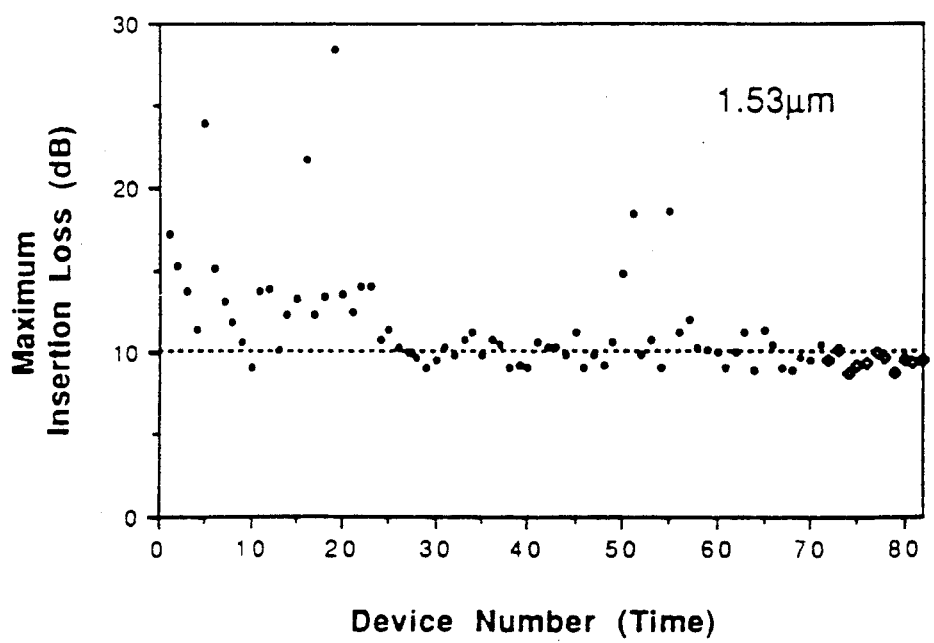
Figure 18:
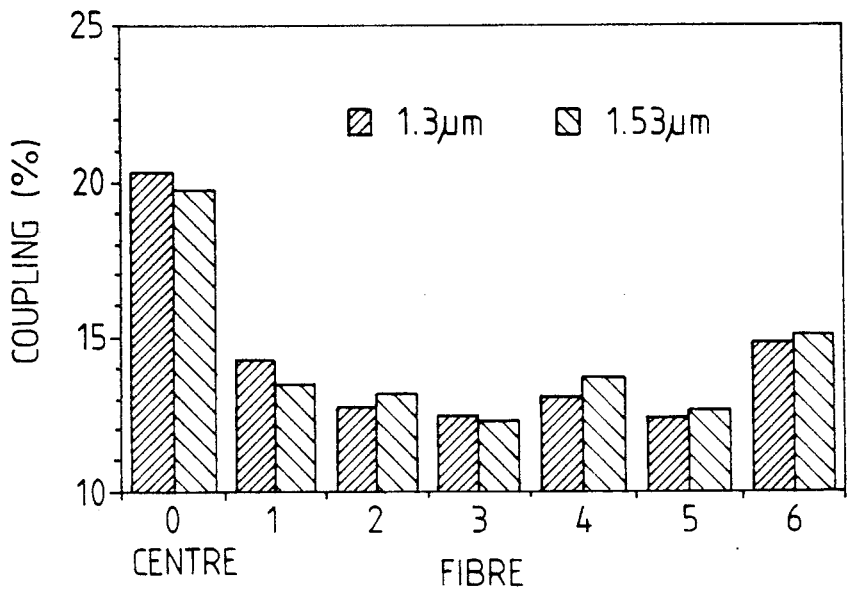
Figure 19:
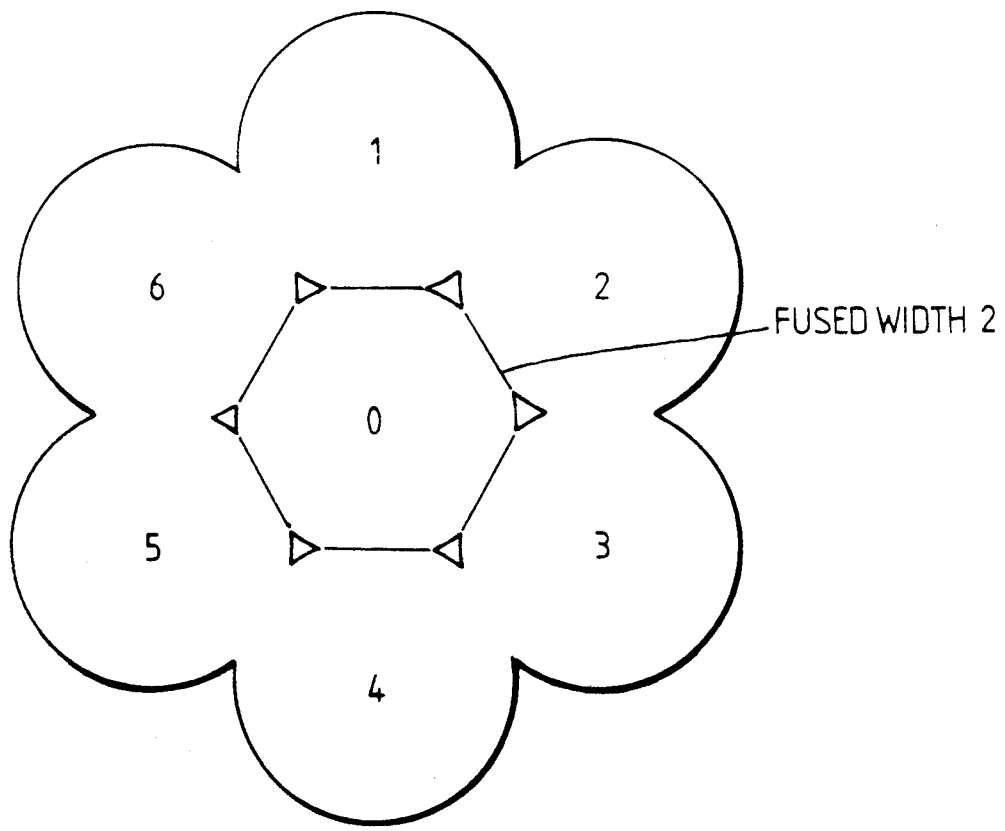
Figure 20:
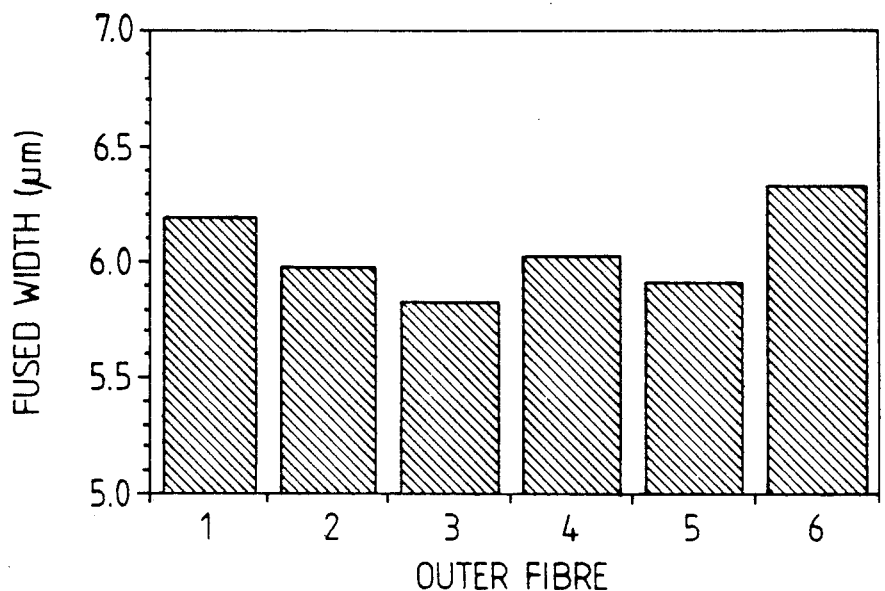
Figure 21:
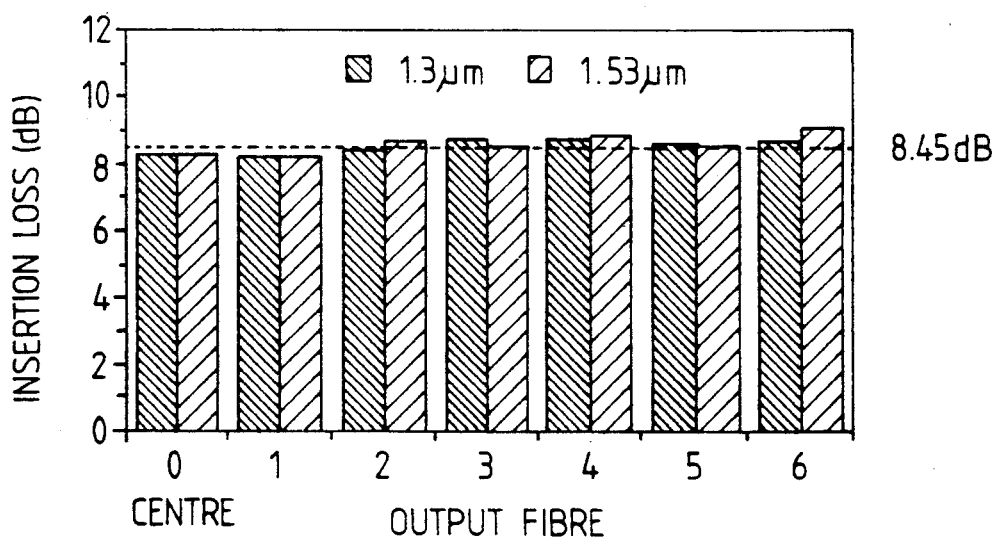
Figure 22:
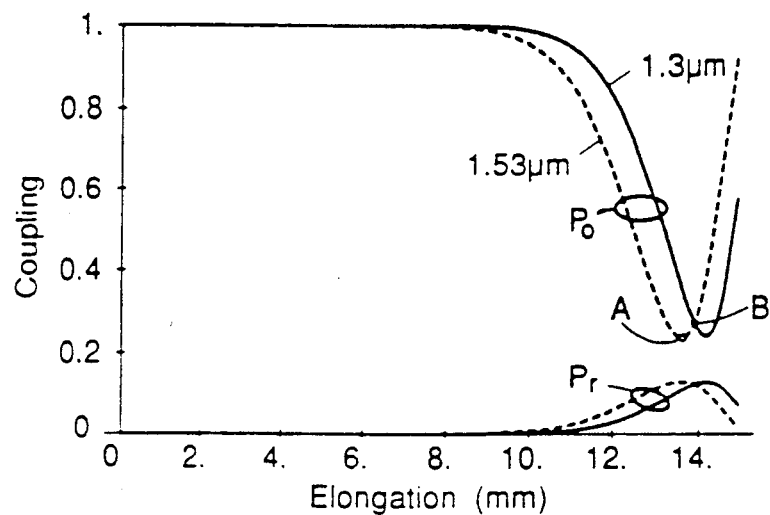
Figure 23:
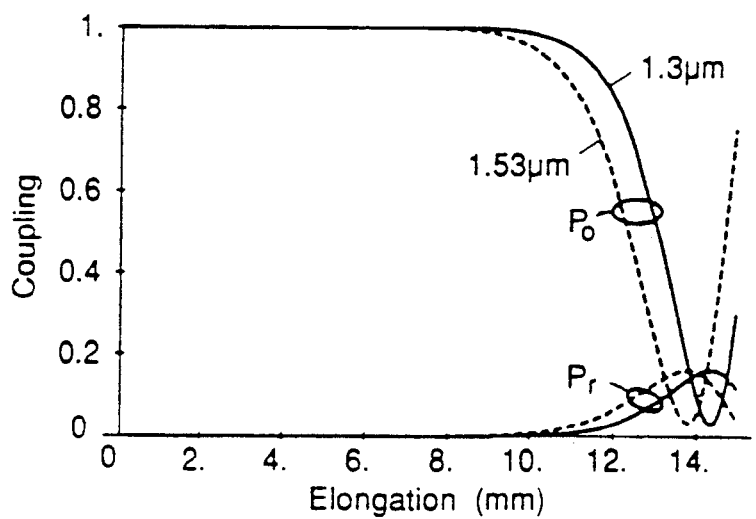
Figure 24:
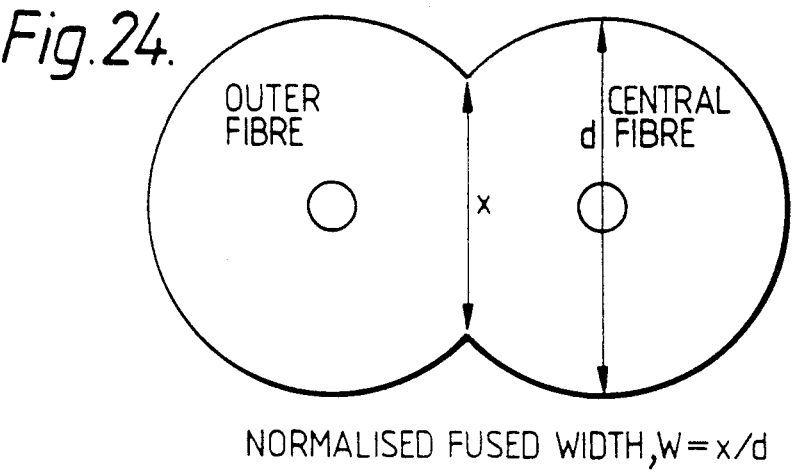
Figure 28:
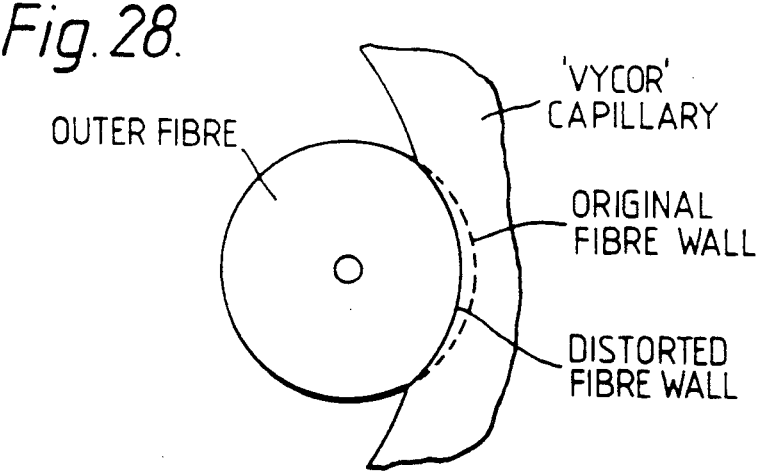
Figure 25:
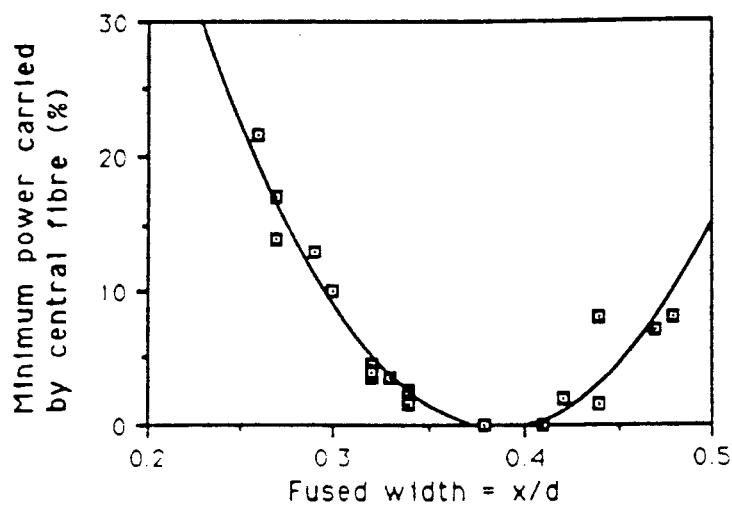
Figure 26:
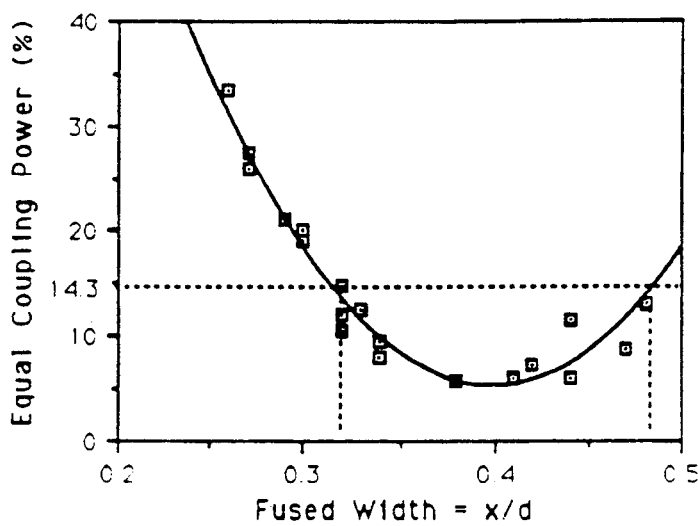
Figure 27:
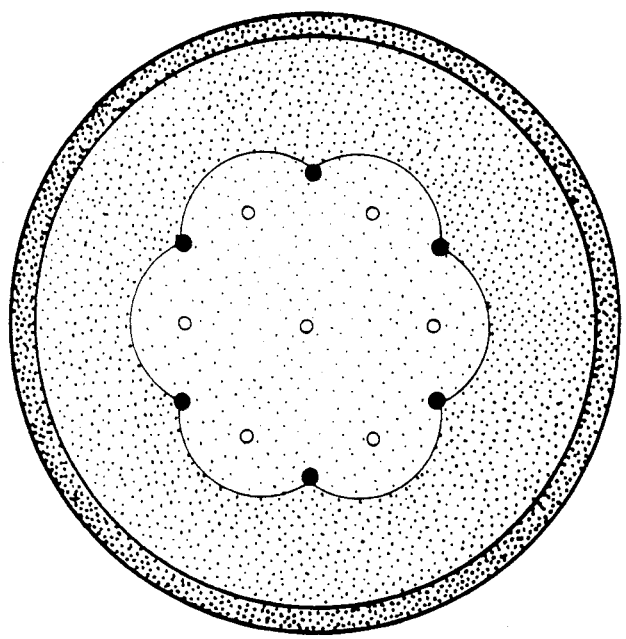
Figure 29:
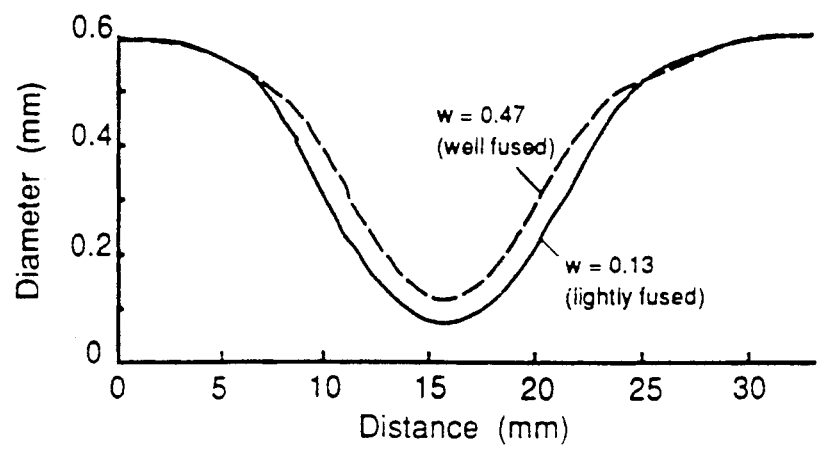
Figure 30:
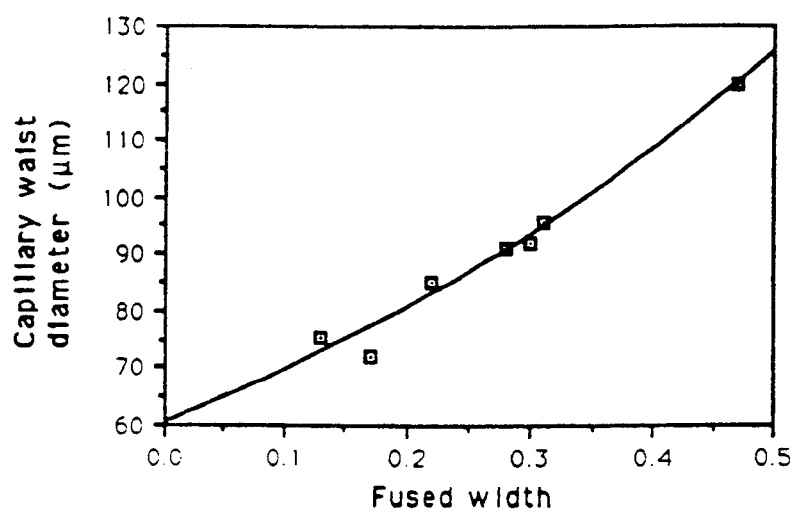
Figure 31:
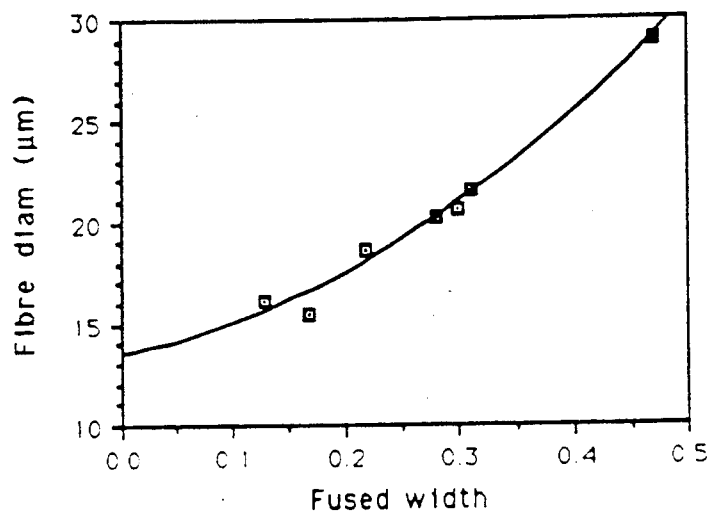
Figure 32:
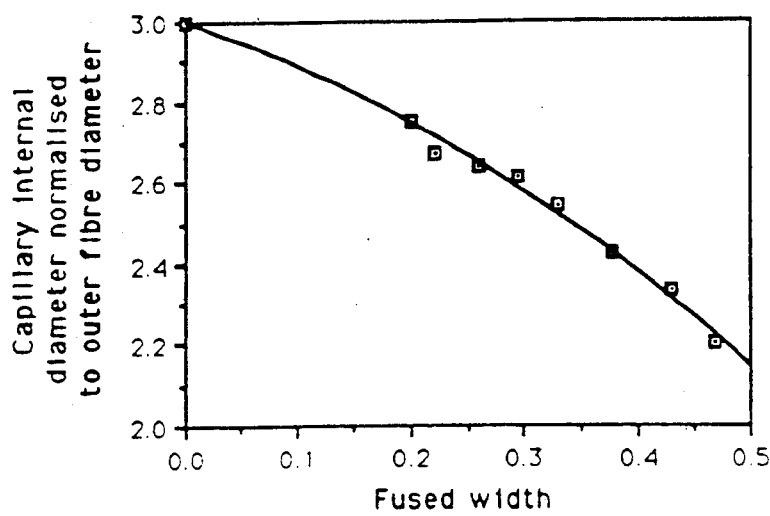
Figure 33:
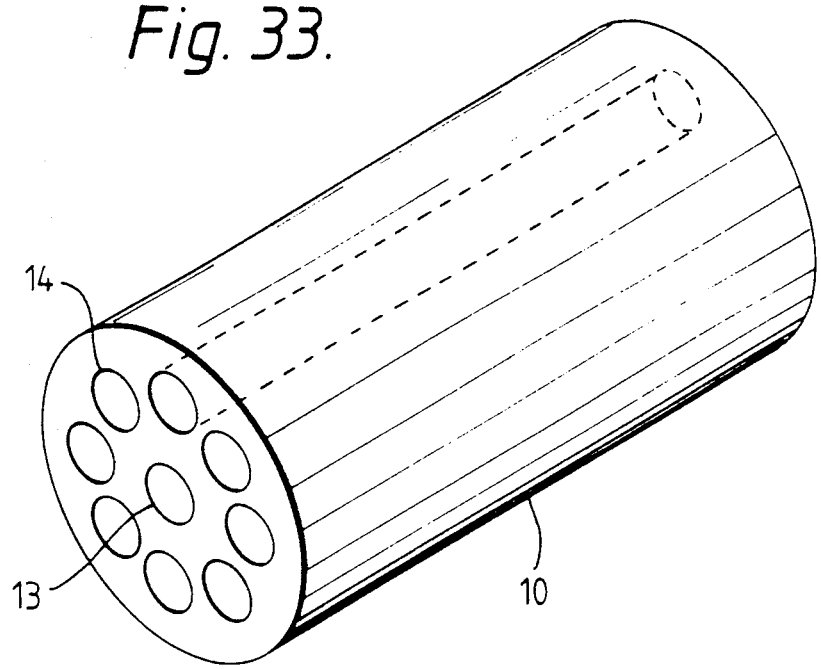
Figure 34:
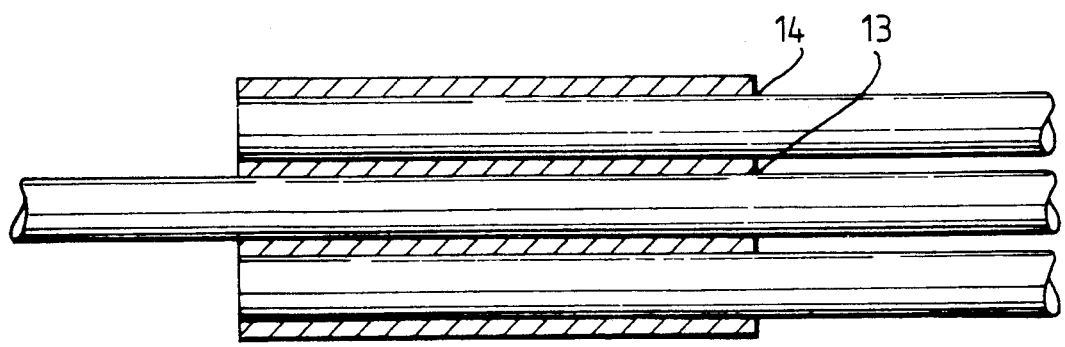

FIGS. 16 and 17 are graphs showing the maximum insertion loss at 1.3 μm and 1.53 μm, respectively, as a function of device number for the group of 1×7 couplers of FIGS. 14 and 15;

FIG. 18 is a histogram showing the percentage coupled power to the output fibres for a non-uniform 1×7 device;

FIG. 19 is a schematic cross-sectional view of a 1×7 coupler according to the present invention showing the measurement of fused widths;

FIG. 20 is a histogram showing the fused widths of the device having the coupling shown in FIG. 18;

FIG. 21 is a histogram of insertion loss showing the achievable uniformity of 1×7 couplers according to the present invention;

FIG. 22 is a graph showing the coupled power for a lightly fused coupler as a function of elongation during fabrication;

FIG. 23 is a graph showing the coupled power for a medium fused coupler as a function of elongation during fabrication;

FIG. 24 is a schematic cross-section of a pair of fused fibres to define a degree of fusion parameter, W;

FIG. 25 is a graph showing the power remaining on a central fibre at 1.53 μm as a function of normalised fusion width W;

FIG. 26 is a graph showing the equal coupling percentage for the two wavelengths 1.3 and 1.53 μm as a function of the degree of fusion W;

FIG. 27 is a illustration showing the waist cross-section of a well fused coupler;

FIG. 28 is a schematic cross-sectional view of an outer fibre due to its interaction with the capillary wall;

FIG. 29 is a graph of the taper profile of light and well fused 1×7 couplers;

FIG. 30 is a graph of the capillary waist diameter as a function of the degree of fusion, W;

FIG. 31 is a graph of the fibre diameter at the waist of 1×7 couplers as a function of the degree of fusion, W;

FIG. 32 is a graph of the normalised capillary diameter as a function of the degree of fusion W; and FIGS. 33 and 34 are a diagrammatic perspective view of a silica glass former for locating the fibres during fusion tapering.

Figure 1:
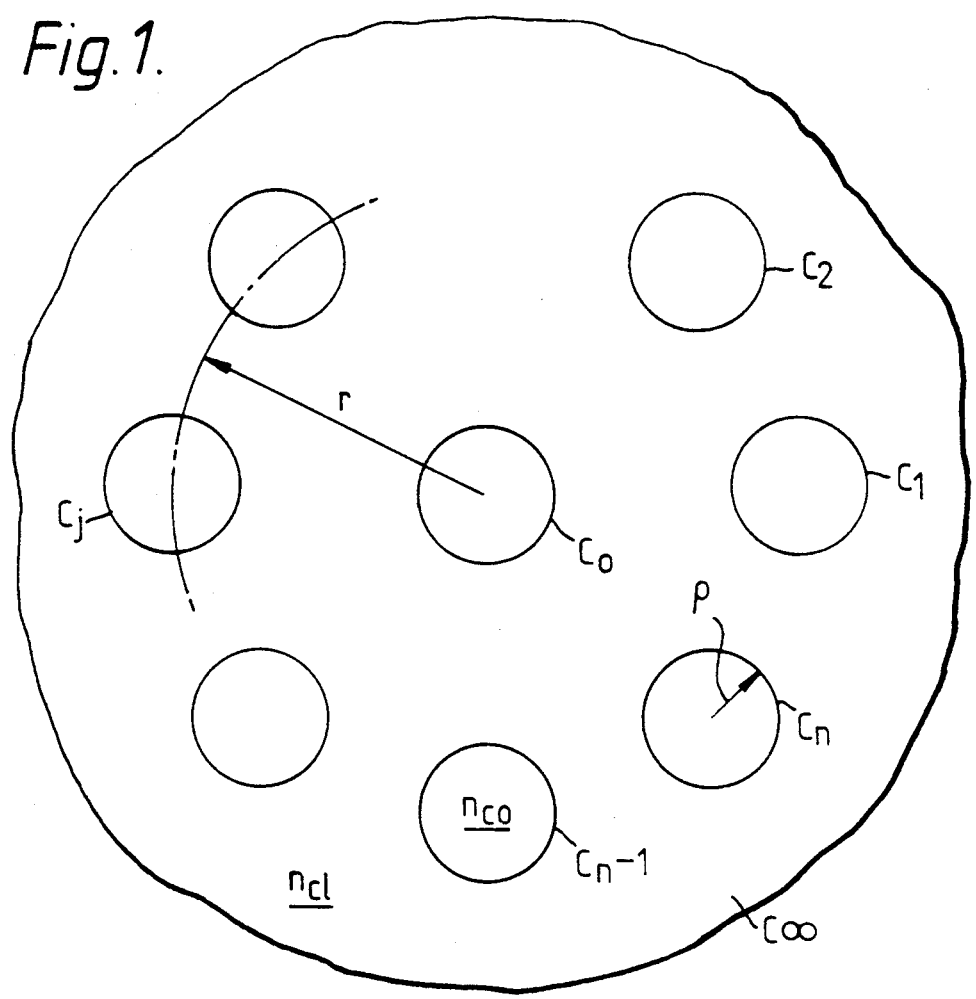

The operating principle of the wavelength-flattened 1×n star couplers can be understood by first considering the coupling between an array of fibre cores in an infinite cladding medium. This is a simple model intended to demonstrate the principle behind the device and its important features. To accurately describe practical devices the model requires modification for specific fabrication techniques. Referring to FIG. 1 a central core region, $C_o$, is surrounded by a ring of n identical secondary cores $C_1$ to $C_n$ with their centres lying on a circle of radius r. The radius and refractive index of each core region is represented by $\rho$ and $n_{co}$ respectively. The infinite cladding $C_{inf}$ medium has refractive index $n_{cl}$.

The set of equations which describe coupling between an array of electromagnetically well separated cores (i.e. $Wd/\rho >> 1$) is well known. Using the notation of Snyder (SNYDER, A. W.,: Coupled Mode Theory for Optical Fibres J. Opt. Soc. Am. 1972 62 11 pp 1267–1277) these equations are, $$\frac{d\,a_p^{(j)}}{dz} - i\beta_p^{(j)} a_p^{(j)} = i \sum_{s \neq j} a_p^{(s)} C_{pp}^{(j,s)} \qquad (1)$$

where $a_p^{(j)}$ is the amplitude of the $p^{th}$ mode of fibre j and $\beta_p^{(j)}$ is its propagation constant. $C_{pp}^{(j,s)}$ is the coupling coefficient for the $p^{th}$ mode between fibres j and s which may be represented by $$C = ((2\Delta)^{\frac{1}{2}}/\rho^{\frac{1}{2}})(K_o(Wd/\rho)/K_1^2(W)) \qquad (2)$$

where U,V and W are the usual modal parameters, $\Delta = (n_{co}^2 - n_{cl}^2)/2n_{co}^2$ and $K_n$ are modified Bessel functions of the second kind. (SYNDER, A. W., & LOVE, J. D.,: 'Optical Waveguide Theory' Chapman and Hall 1983 p 392). With single-mode cores only the $HE_{11}$ mode is excited and therefore no other mode coupling is involved. By considering nearest neighbour coupling only, with cores equally spaced around the ring, it can be shown that the coupling of power from the centre core to the other cores can be reduced to a two mode problem. This is because there are only two (out of a possible n+1) normal modes of the array which have finite fields at the central fibre. These two modes have different propagation constants and it is the beating of these modes which gives rise to an apparent power exchange between the central and surrounding cores. There is significant power exchange only if these two modes are similarly excited when light is launched into the central core. For an array of more than two cores there will in general be incomplete power transfer from the central core. For the special case of equally spaced cores around the ring the maximum power transfer between the central and surrounding fibres, F, is $$F = \left[1 - \left(\frac{C_{pp}^{(1,2)}}{n\,C_{pp}^{(1,n+1)}}\right)^2\right]^{-1} \quad n > 2 \qquad (3)$$

or, by using equation (2), $$F = \left[1 - \left(\frac{K_o(Wd^{(1,2)}/\rho)}{n\,K_o(Wd^{(1,n+1)}/\rho)}\right)^2\right]^{-1} \quad n > 2 \qquad (4)$$

where W is a function of V. If V>1 then to a good approximation, $$W = 1.122 \exp\left(\frac{-J_o(V)}{VJ_1(V)}\right)$$

The maximum coupled power at a given wavelength is therefore seen to depend upon the number of cores in the ring, their radii, separations and V value.

The coupled power as a function of z for a variety of array geometries will now be discussed. To allow complete freedom in the positioning of the cores the set of equations (1) are numerically integrated with C given by (2). For the results described here the radius of each core, $\rho$, was set to 2.8 μm and the circle radius, r to 12.93 μm so that reasonable V values, optical separation and coupling length were obtained. The refractive index of the core and cladding regions are 1.4542 and 1.4500 respectively.

Figure 3:
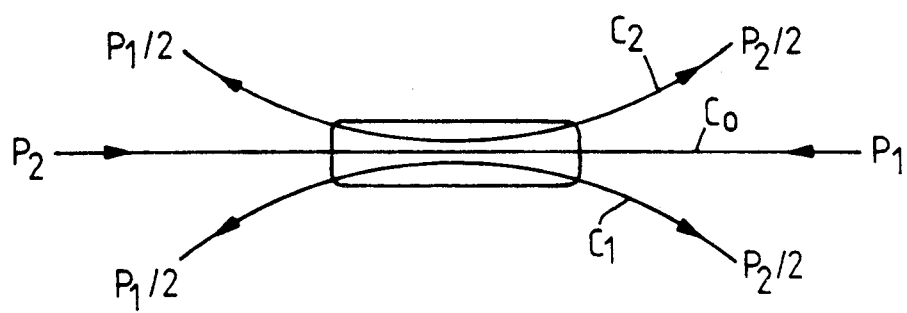
Figure 2A:
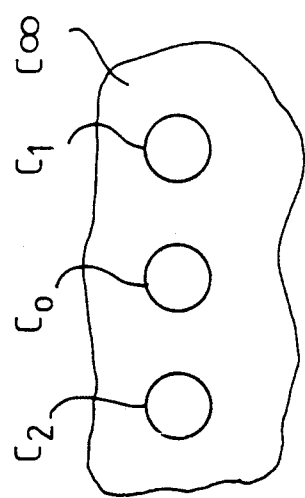
Figure 2B:
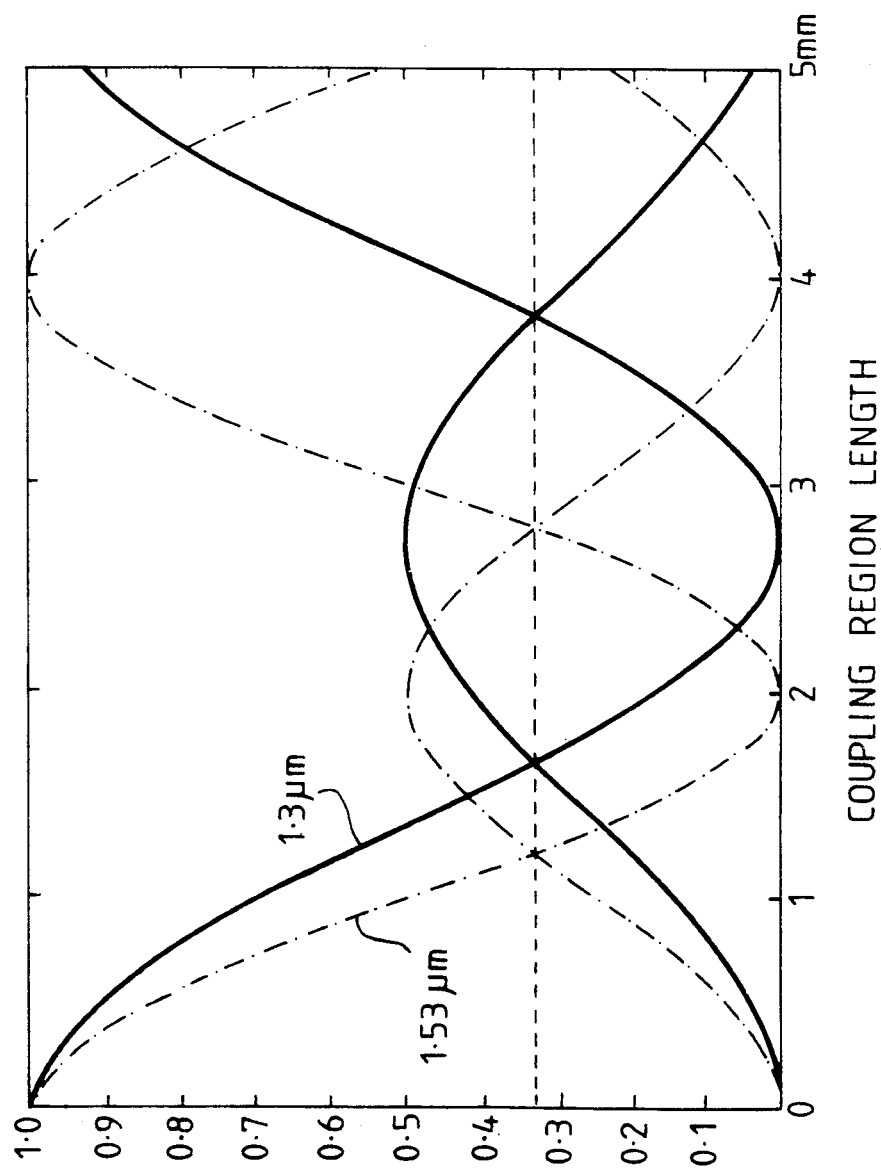
Figure 4A:
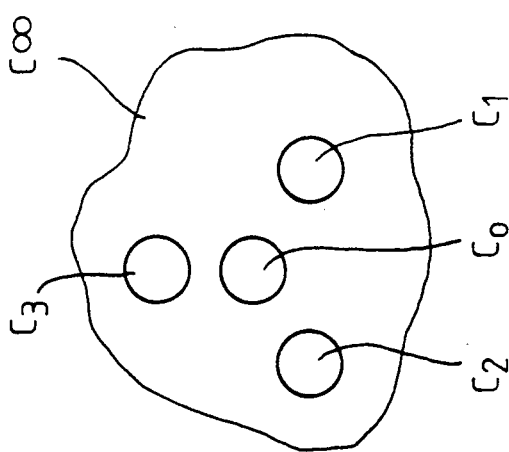
Figure 4B:
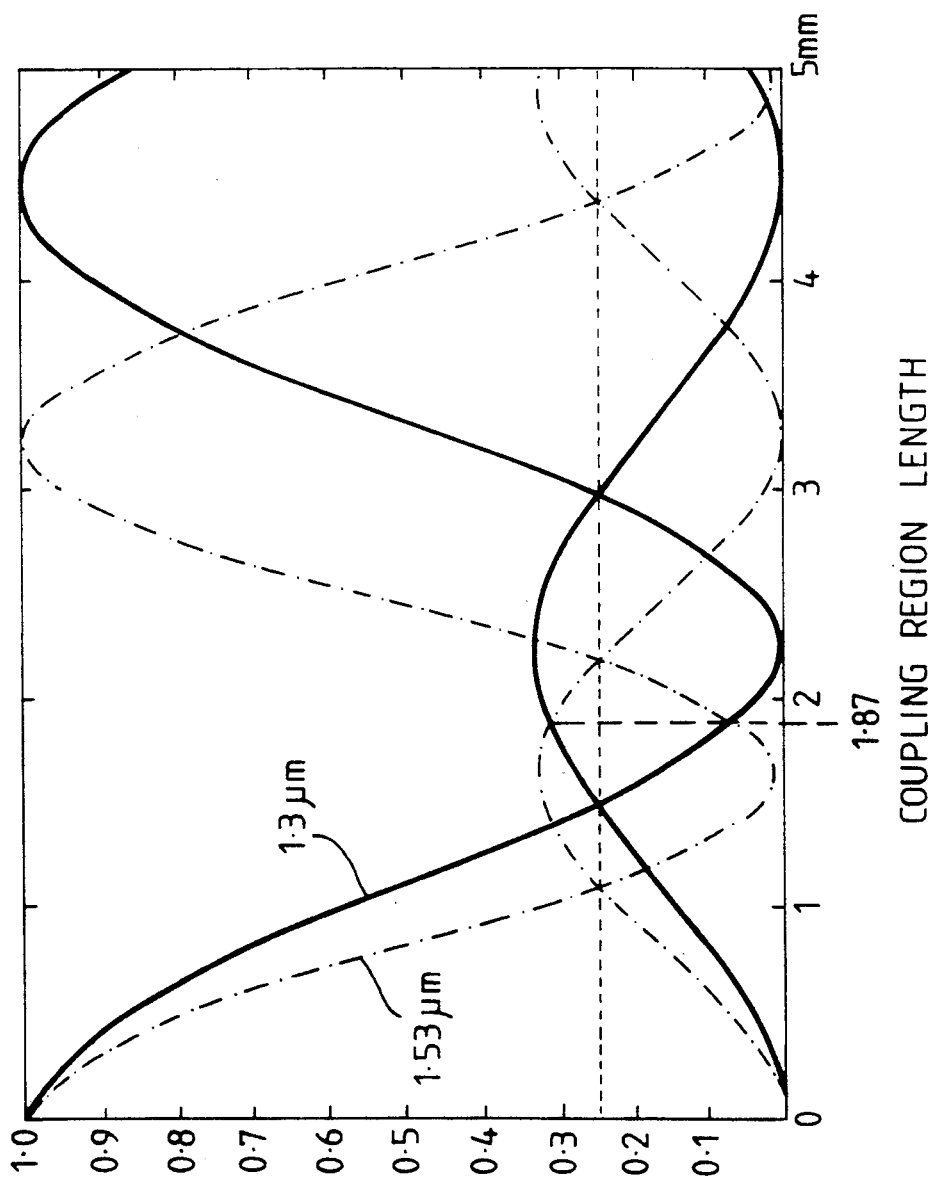

The optical power guided by the central and surrounding secondary cores is calculated as a function of the propagation distance z. In each case light is considered to have been launched into the central core of a 1×N array (where the number of secondary fibres. n=2 to 7) and the power guided by each core is plotted for two wavelengths, 1.3 μm and 1.53 μm. 1×2 coupler (n=2): The coupling characteristics of the three core array of FIG. 2(a) are shown in FIG. 2(b). As expected the longer wavelength couples first and equally to the two surrounding fibres until all power is transferred. The shorter wavelength following closely behind. With this particular core arrangement complete power transfer is obtained. Around the region where equal coupling is observed at both 1.3 and 1.53 μm (z=2.3 mm) the wavelength response between those wavelength is small. A device fabricated to this specification (by the fused taper technique for example) is therefore, wavelength flattened with a coupling ratio of about 0.47 between the central core $C_o$ and each of the other two cores $C_1$ and $C_2$. Further, by forming a coupler on the configuration shown in FIG. 3 a bidirectional wavelength flattened coupler is obtained which may be useful for some network configurations where it is necessary to divide power at arbitrary wavelengths bi-directionally. 1×3 coupler (n=3): The graph of FIG. 4(b) shows that complete coupling from the central core to the three surrounding secondary cores is almost completely obtained. At the equal coupling point for the two wavelengths we once again have a wavelength-flattened device. The wavelength response at z=1.87 mm is shown in FIG. 5. 1×5 coupler (n=4): It will be seen from the graph 6(b) that incomplete coupling of power from the central core is obtained with five core coupler show at FIG. 6. which adds to the overall excess loss of the device if used in the 1×4 configuration. In common with the previous cases, the central core may of course be used where a core carrying reduced power is unimportant or desirable however, equal split devices are advantageous and a method of forming an equal split in such a five core coupler will be discussed.

Figure 7A:
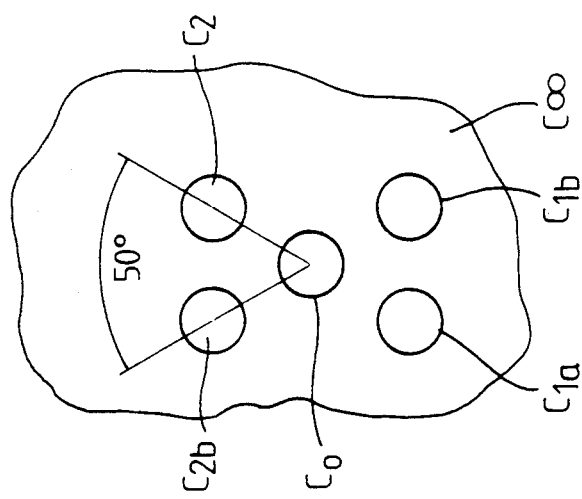
Figure 7B:
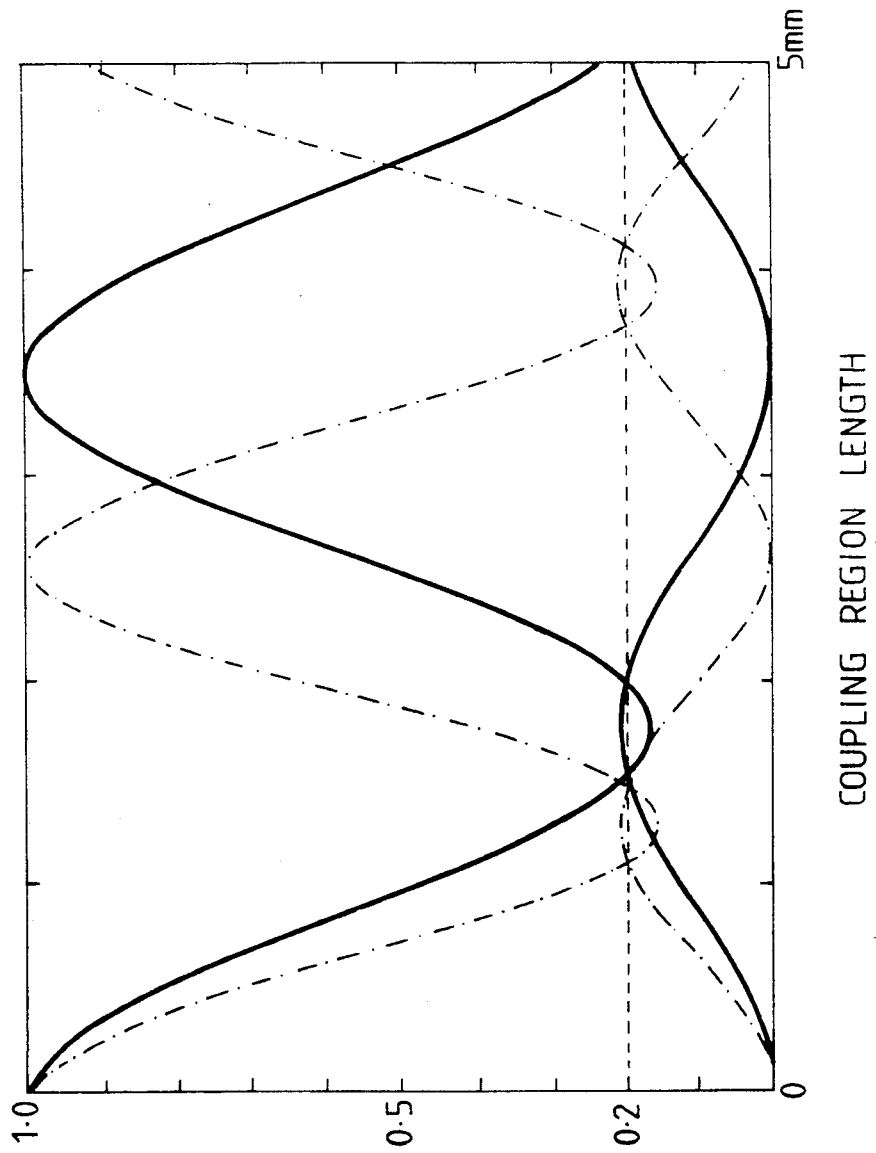

Referring now to FIG. 7 there is shown at FIG. 7(b) the coupling obtained with a five core array where the cores surrounding the central core are grouped into two pairs of two ($C_{1a}$, $C_{1b}$ and $C_{2a}$, $C_{2b}$) as shown in FIG. 7(a). The pattern of cores around any core in the ring is identical to that around any other (where mirror symmetric arrangement core regarded as identical) and therefore these cores will always carry the same optical power given equal excitation. The effect of this grouping however is to change the maximum coupled power. By carefully choosing the angle between the core pairs the region of equal coupling for the two wavelengths can be made to occur such that an equal power split amongst all five cores is obtained. That is the central core retains 1/5 of the power injected into it. The resulting device is a bi-directional wavelength-flattened 1×5 coupler with 1/5 of the light injected into the central core emerging from each of the five cores of coupler rather than a less efficient 1×4 coupler in which between ¼ and 1/5 of the light injected into the central core emerges from each of the secondary fibres.

Figure 8A:
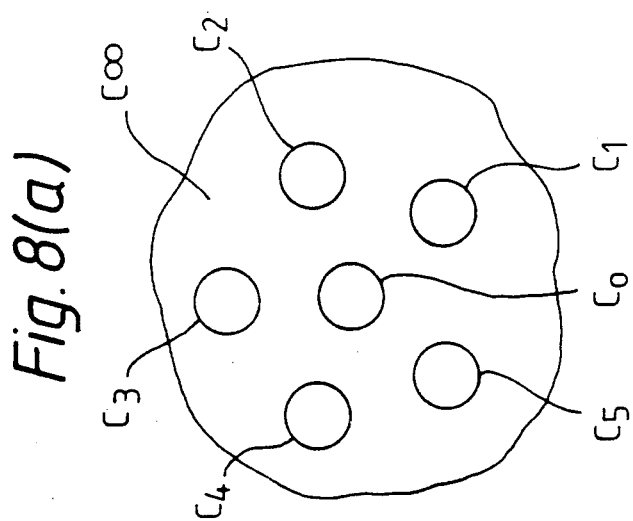
Figure 8B:
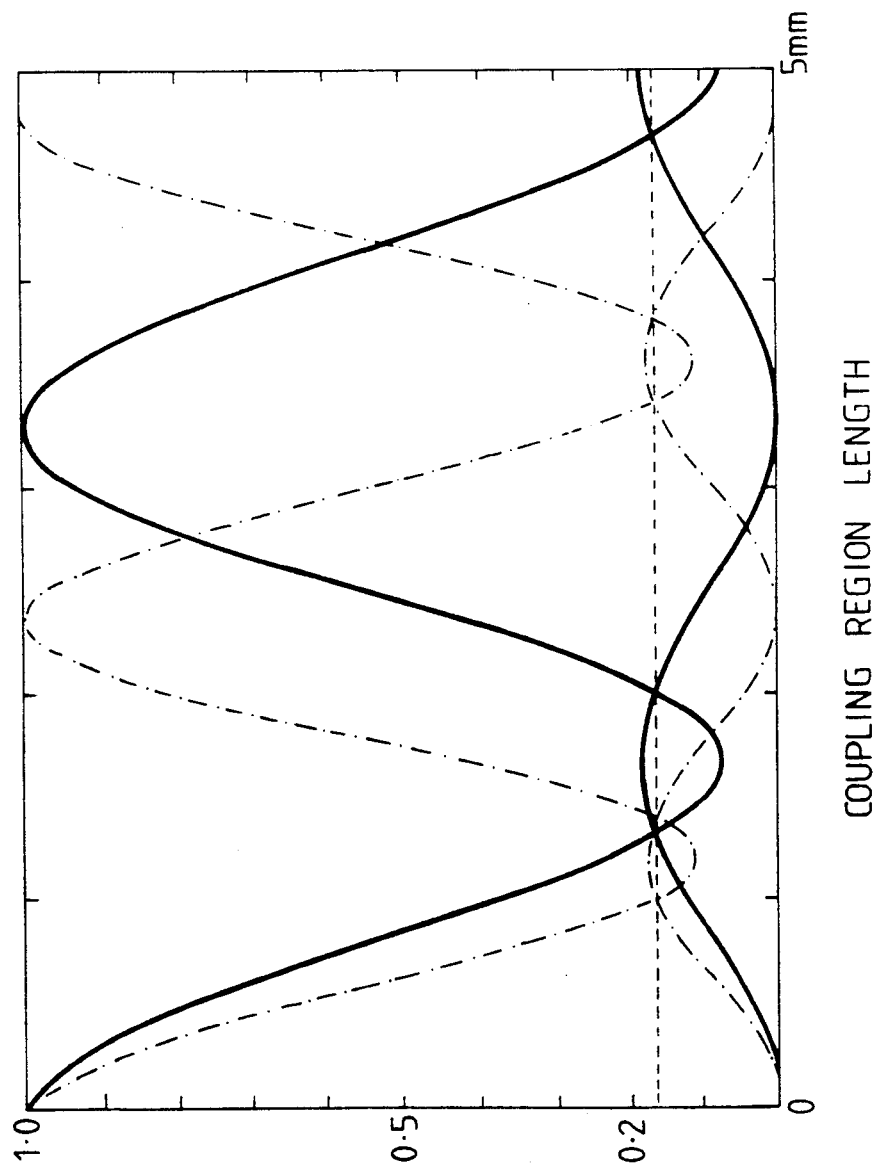
Figure 9:
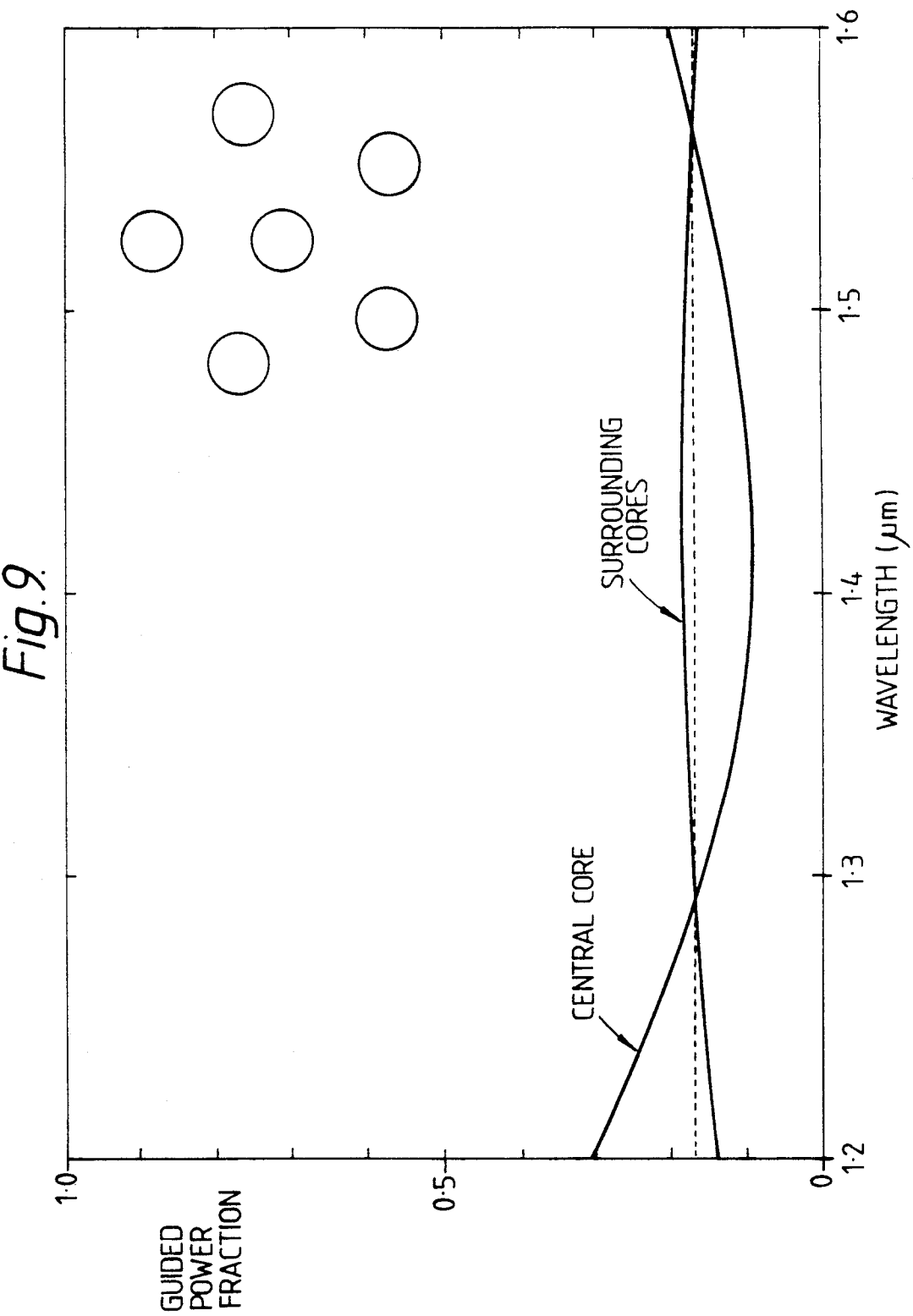
Figure 10A:
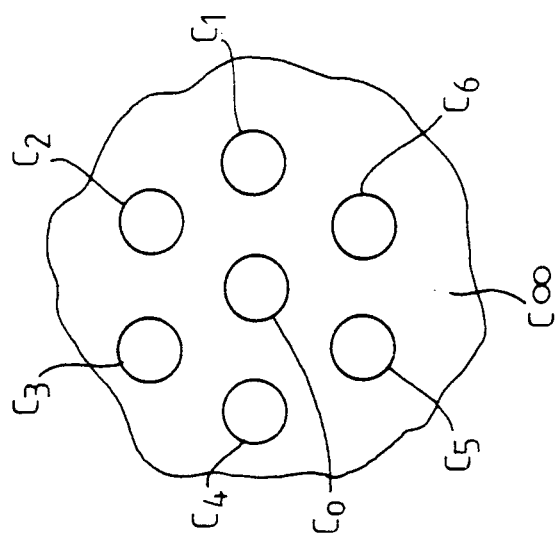
Figure 10B:
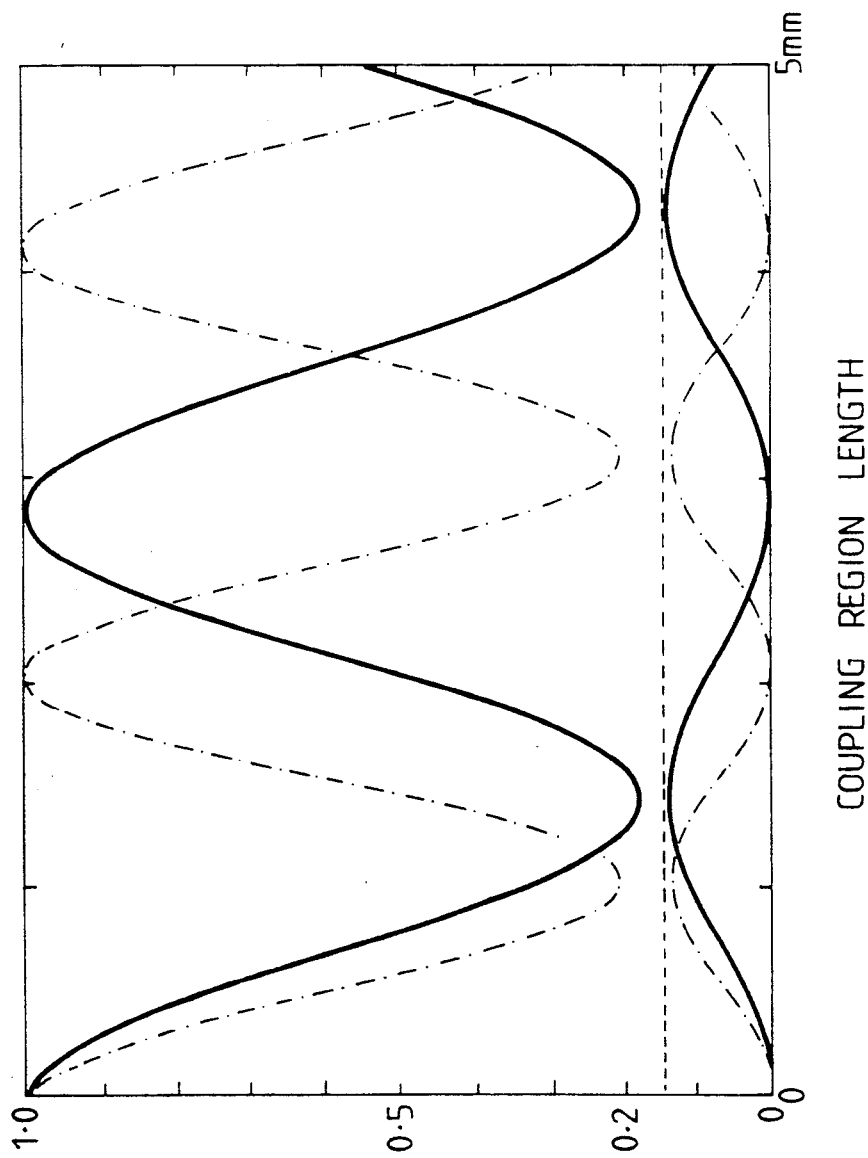

From the coupling curves of FIG. 7 one can see that the power coupling variation with wavelength will be four times greater in the central core than in the surrounding cores. By choosing the manufacturing method appropriately this residual wavelength response can be minimised. 1×6 coupler (n=5): For the particular V values and optical separations used here. the six core coupler shown in FIG. 8(a) shows a fortiutous equal coupling for the two wavelengths close to the region of equal power split as can be seen from FIG. 8(b) and so forms a 1×6 coupler. For this 1×6 coupler the cores in the ring have five times less variation of power with wavelength compared to the power in the central core. The wavelength response of this device is shown in FIG. 9. Couplers fabricated having other effective V values and core separations may have the equal coupling point for the two wavelengths at different values of power split. For some methods of manufacture and fibres the equal split point will in general occur for a different number of cores. however the principle under discussion will be the same. The manufacturing parameters to achieve a particular split at integral number of fibres can be readily determined by trial and error in order to obtain the degree of coupling between the central and n surrounding fibres such that the equal coupling point for the two wavelengths occurs at the 1:(n+1) coupling ratio thereby producing a wavelength flattened 1:N coupler (N=n+1) according to the present invention. This will be discussed in more detail with respect to adjusting the coupling in a 1×7 (n=6) coupler according to the present invention. 1×7 coupler (n=6): The coupling characteristics of the seven core array shown in FIG. 10(a) are shown in FIG. 10(b). For this arrangement the theoretical model shows that the maximum coupled power is not sufficient for an equal power split between the seven cores $C_1$ to $C_7$ and grouping in pairs only makes the situation worse by reducing further the amount of light coupled to each secondary fibre. To increase the maximum coupled power the relative size of the central core may be increased slightly. This technique allows the principle to be extended to devices with a large number of cores. however the maximum coupled power is very sensitive to the central core radius. An exemplary method of forming a 1:N coupler using identical fibres according to the present invention is as follows.

A particular 1×7 coupler of the arrangement of FIG. 10a was formed as follows.

Figure 11:
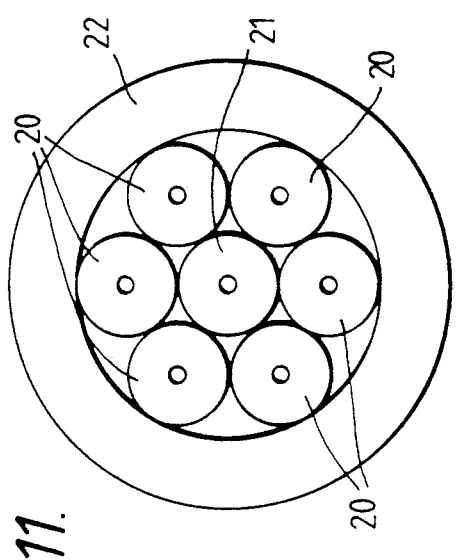
FIG. 11 is a diagramatic cross-section of the cross-section of an exemplary seven core coupler.

Referring to FIG. 11, seven standard single mode 124.7 μm outside diameter fibres 20, 21 are stripped of their primary coating, cleaned and constrained in a hexagonal, close-packed array by insertion into a tight fitting silica base glass capillary tube 22 having a refractive index slightly less than pure silica. The central fibre is referenced as 21. The particular tube used was 'Vycor' obtainable from Corning Glass of 380–382 μm inside diameter. A tube of the same refractive index as the fibre cladding is also expected to work successfully. The 'Vycor' tube material was chosen because its refractive index is lower than that of the silica fibre cladding so that leakage of the optical field into the tube material is minimised. Other dimensions of fibre and tube may be used but the elipticity should be less than or equal to about 1 μm.

A standard fused coupler fabrication equipment was used to form the tapered coupler being the fibre bundle heated and pulled in the usual manner. The light carried by the central fibre and the six fibres in the ring monitored at both 1.3 μm and 1.53 μm during the pulling process.

To conveniently measure the total power carried by the outer fibres all six fibres were cleaved and placed together at the input port an integrating sphere so that only two detectors needed to be used. When the coupling at the two wavelengths become equal the elongation process was stopped and the device is packaged.

Figure 12:
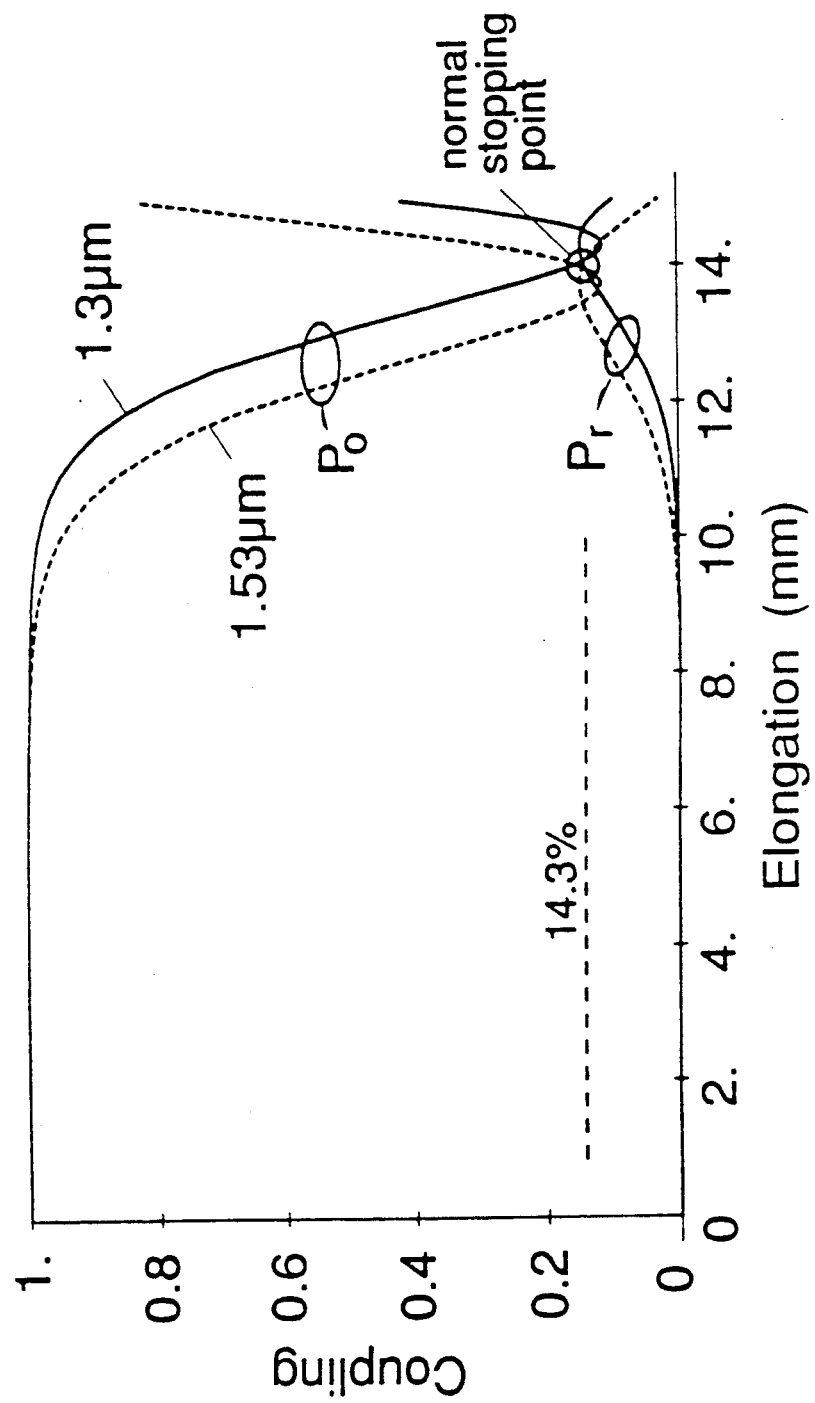
FIG. 12 is a graph of the power carried by the central fibre of the seven core coupler of FIG. 11 as a function of coupler elongation.

Whilst monitoring the power received in each of the two integrated spheres, the capillary tube assembly is heated and tapered. An example of the graph obtained during fabrication is shown in FIG. 12 where Po is the power in the central fibre. When equal coupling at 1.3 $\mu$m and 1.53 $\mu$m is obtained, elongation of the coupler is stopped and the device is packaged. Package sizes of 80 mm ×4 mm diameter are typical.

Figure 13:
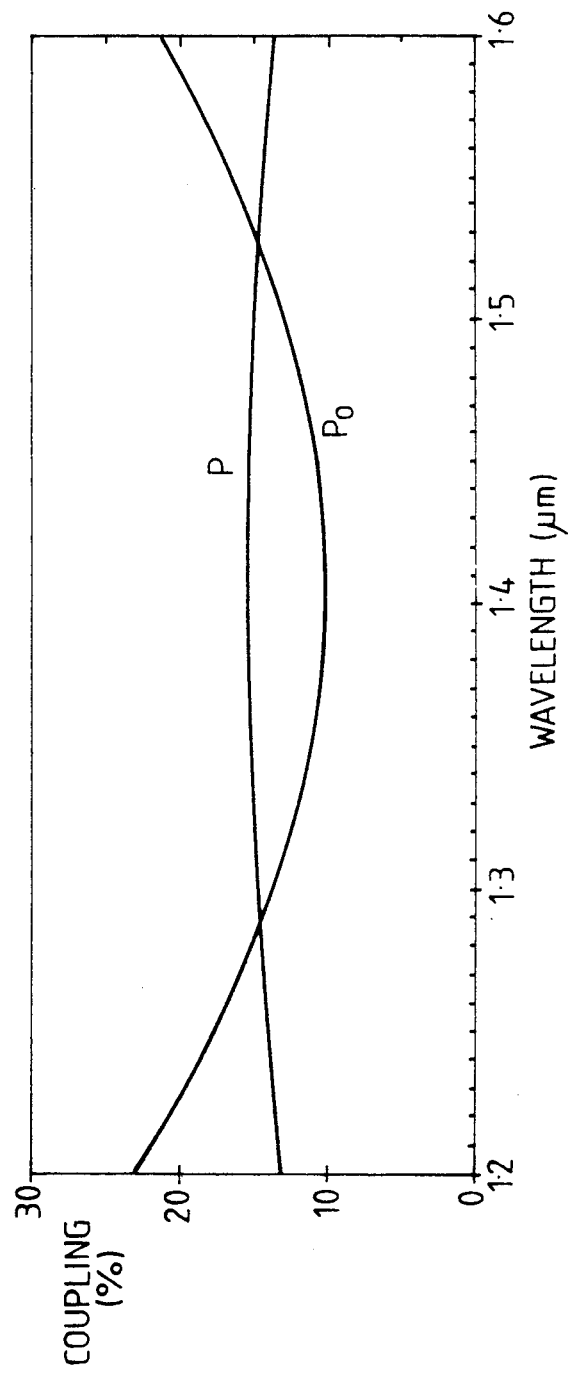
FIG. 13 is a graph of the spectral response of the coupler of FIG. 11.

The spectral response of the coupler is shown in FIG. 13. All fibres 20 in the ring have a similar wavelength response. Only the results for one surrounding fibre is shown together with the response of the centre fibre. The figure clearly shows the flat wavelength response of the outer fibres. The maximum coupled power at 1.415 $\mu$m is 0.7% above the value at 1.3 or 1.53 $\mu$m. The central fibre has a greater coupling variation with wavelength as expected. It should be emphasized however that the minimum coupling value at 1.415 $\mu$m (9.3%) is comparable to what one would obtain by knitting together discrete 2×2 wavelength-flattened couplers.

Eighty-two 1×7 couplers have now been fabricated by the applicant. During the experiments the fabrication process and techniques have been refined in order to yield devices having low-loss with good coupling uniformity. The results of these experiments are as follows.

The histograms of FIGS. 14 and 15 show the excess loss of the eighty-two couplers at the wavelengths of 1.3 $\mu$m and 1.53 $\mu$m respectively. The results corresponding to the most recent batch of eleven devices, using identical process parameters and technique, are shown separately in the lighter shade. An excess loss category of $E_1$ means that the excess loss is between $E_1$dB and $E_1+0.1$ dB. The means excess loss and standard deviation of these recent devices is 0.08±0.06 dB and 0.06 dB±0.04 dB at 1.3 $\mu$m and 1.53 $\mu$m respectively. For many applications these excess losses are negligible. Inspection of the older high loss devices usually show the presence of dust particles or trapped bubbles of air causing fibre distortion. These problems have now been eliminated due to careful cleaning and handling, assembly in clean air cabinets and control of the furnace temperature profile.

For each of the eighty-two devices fabricated, the power on each of the seven output fibres is measured at the two wavelengths 1.3 and 1.53 $\mu$m. Ideally every path through each coupler would have a coupling of 1/7, 14.3% or 8.45 dB, at both wavelengths. In practice however, limitations of the fabrication technique lead to a distribution of coupling values about the mean. From the systems designers point of view, the important parameter for any coupler or coupler array is the insertion loss measured on the worst case path through to device. This maximum insertion loss is therefore a useful parameter for describing device performance.

In FIGS. 16 and 17 the maximum insertion loss of every coupler fabricated is plotted as a function of device number at 1.3 and 1.53 $\mu$m respectively. The device number also represents time or order of fabrication with the very first 1×7 coupler represented by number 1. It can be seen from the figures that the first twenty-five devices or so have a large spread in maximum insertion loss. This spread is almost entirely due to coupling non-uniformity with excess loss having only a minor contribution.

Investigation of these non-uniform devices show a direct correlation between coupled power and the fused width between each outer fibre and the central fibre. In FIG. 18, for example, the coupling of a particular non-uniform device is shown. The coupler was then cleaved at the waist and the measurements of fused width were made as illustrated in FIG. 19. These widths are shown in the histogram of FIG. 20 where the direct correlation with the coupled powers of FIG. 18 can be seen.

For the next forty-five or so couplers the tapering parameters were varied in order to explore the range of coupling variation which could be achieved. Finally the test batch of eleven device were fabricated with the aim of producing the most uniform power split possible. The results are shown by the diamond symbols in FIGS. 16 and 17. The maximum insertion losses for the batch are around 10 dB or less with a mean maximum loss of 9.44 dB at both wavelengths. The figure of 10 dB is significant at this compares favourably with the maximum insertion losses of similar couplers fabricated from concatenated 2×2 devices.

During these experiments the optimum capillary sizes and fibre handling techniques were determined.

The 1×7 couplers were made as follows.

Seven lengths of standard system, matched cladding fibre of about 1 meter each have a few inches of cladding removed from one end. These are then threaded into a 30–75 mm long Vycor capillary tube. It has been found important to carry this out in very clean conditions, in a clean environment and with repeated wiping of the fibres with an ethanol impregnated cloth. The fibre bundle and capillary are then taped to mounts on the sliders of a tension fusion apparatus, about 75 mm apart. One slider mount is rotated to twist the bundle of fibres. About 1 revolution is needed for each 25 mm between the slide mounts. The applicant has found that this twist greatly improves the consistency of the coupler formation.

The central fibre is identified by shining light down each fibre in turn until visual inspection of the fibres at the capillary with a lens shows which tail is associated with the central fibre.

The coupler is then formed by heating the capillary tube whilst pulling the fibre bundles apart all the time monitoring the amount of light coupled out of the central fibre at 1.3 $\mu$m and 1.53 $\mu$m. The rate of elongation of the coupler during fusion is set at in the region of 200 $\mu$m per second which is slow enough to monitor progress of the coupler formation. The tuning is controlled via the tension applied during pulling of the coupler with feedback from a tension sensor to the heater of the fusion apparatus heating zone to maintain the temperature for the desired tension. The higher the tension the lower the temperature hence less fusion of fibres than if a lower tension were preset.

For the apparatus and components above, a wavelength flattened, 1 to 7 coupler is obtained with a pulling tension which starts at 2 gms and reduces linearly to 0.9 grams over 10 mm of elongation and maintaining 0.9 gm until crossover. This is obtained with a fusion temperature of about 1600° C.

A well-fused coupler, as described in this application has a tension of 1 gm reducing linearly to 0.3 gm over 10 mm of elongation and maintained until cross-over. A lightly fused coupler a tension of 3 gm reducing linearly to 2 gm which is maintained until cross-over.

These values will need to be varied for fibres of different dimensions and values of n and whether a 1 to (n+1) or 1 to n coupler is required. They will also vary with the crucible size etc. of the particular fusion apparatus used but will be readily determined by trial and error. The six secondary fibres are then snapped off near the capillary tube to leave the central fibre. This is then spliced to a normal clad fibre about 25 mm from the capillary. The device is then ready for packaging.

This splice can be avoided if the central fibre is pre-prepared to have a strip of cladding removed with cladding left on each side but this will require some degree of manipulation to ensure this fibre ends up as the central fibre.

A splice may also be avoided if the central fibre has a cladding reinstated by a suitable coating process.

Other capillary tubes may be suitable for the manufacture of couplers according to the present invention—for example a silica tube lined with a lower index coating pulled down to a capillary of the desired internal diameter.

The achievable uniformity of the 1×7 devices can be highlighted by showing the insertion loss for each path through a coupler, as illustrated in FIG. 21.

The maximum insertion loss of this device is 9.06 dB at 1.53 μm with a mean of 8.53±0.2 dB, where the tolerance is one standard deviation.

During the tapering of the 1×7 couplers it was noticed that the maximum power coupled to the fibres in the ring, varies with the degree of fusion of the structure. FIGS. 22 and 23 for example show the coupled power versus elongation for two devices having different degrees of fusion. In FIG. 22, 24% of the input power remains on the central fibre whereas for the device shown in FIG. 23, 3% remains.

To check the polarisation sensitivity of the device, a 1.3 μm laser with linearly polarised output was spliced to the central input fibre via a three loop polarisation controller. Whilst monitoring the power output from each fibre in turn, the polarisation controller was adjusted so that all possible polarisation states were launched into the coupler. The maximum and minimum power readings were recorded. The results showed that the central fibre had very little polarisation sensitivity as expected from the symmetry of its position. The coupling varied by less than ±0.02% with respect to the power input. The outer fibres in the ring showed a greater variation with polarisation due to their non-symetrical position. Coupling variations of ±0.25% were observed with respect to the input power.

Experiment, as discussed above, has shown that the maximum power coupled to the fibres in the ring varies with the degree of fusion of the structure.

To investigate the phenomenon a number of devices were fabricated having various degrees of fusion ranging from lightly fused to well fused. To quantify the degree of fusion, each device was cleaved as near as possible to the waist of the taper. One of the cleaved was then examined under a microscope equipped with a distance measuring facility. The parameter chosen to represent degree of fusion is the ratio of the fused width between the central and outer fibres, and the central fibre diameter, as illustrated in FIG. 24. This ratio will be called the normalised fused width and will be represented by the symbol W. An unfused device and a completely fused seven fibre array will therefore be characterised by W=0 and W=0.5 respectively.

In FIG. 25 the minimum power at 1.53 μm remaining on the central fibre (point A on FIG. 22) is plotted as a function of the normalised fused width. As the degree of fusion increases the power remaining on the central fibre gets less until at W=0.38 all power is removed from the central fibre. With increasing fusion the trend reverses and the power remaining on the central fibre is seen to increase. Equal coupling of 14.3% between all fibres occurs at W=0.28. For wavelength-flattened 1×7 couplers the parameter of interest is the equal coupling point for the two wavelengths. FIG. 26 shows how this equal coupling point (B on FIG. 22) varies with degree of fusion. The graph is similar to FIG. 25 except that at W=0.38 the minimum power remaining on the central fibre is ≈5%. From this graph it can be seen that as equal power split between the seven fibres can be obtained at two degrees of fusion, W=0.32 and W=0.48.

To investigate distortion of the fibres caused during fusion a thin slice of the coupler around the waist region was cut and polished. This sample was then viewed under an optical microscope using illumination which highlights the different regions of refractive index. A drawing illustrating a well fused sample is shown in FIG. 27. The seven cores and the boundary between the cladding of the outer fibres and the 'vycor' is easily seen. The outer fibres are clearly distorted out of round due to being embedded in the capillary wall.

From careful inspection of the cross-sectional geometry of the coupler it appears as though the deformed outer fibres have a shape as shown in FIG. 28. Within the capillary we find that the fibre retains its circular form with the distortion only appearing at the fibre capillary interface. This distortion implies that the cross-sectional area of the fibre is not conserved, as the fibre would otherwise take on an elliptical appearance. It is assumed that the material lost in the cross section produces an increase in fibre length.

Using a laser based diameter measuring system, the diameter variation of the various tapers was recorded. FIG. 29 shows the taper profile of the extreme light and well fused devices obtained, corresponding to W=0.13 and W=0.47 respectively. The variation of capillary waist diameter with degree of fusion is shown in FIG. 30. Over the range of W achieved in practice, the waist diameter varies from ≈70 μm for lightly fused devices to 120 μm for well fused devices.

From measurements of cleaved cross sections it is possible to relate the capillary diameter to the fibre diameter and hence the fibre diameter at the tapers waist to the degree of fusion. The fibre diameter is not just a simple proportion of capillary diameter because with increasing fusion the fibres are further embedded into the capillary wall. The relationship between waist fibre diameter and degree of fusion is shown in FIG. 31. Variation between 15 μm and 30 μm is seen with increasing fusion. This graph clearly shows that the same coupling is achieved between well fused large fibres and lightly fused small fibres. A quadratic curve fit to the experimental data of fibre radius of the waist gives, $$r_r = 6.74 + 5.06W + 24.48W^2 \quad (\mu m)$$

From further measurements of coupler cross-sections the internal capillary diameter as a function of degree of fusion is shown in FIG. 22. The diameter is normalised to the fibre diameter such that with W=0, R=3$r_r$. A quadratic curve fit to the experimental data gives, $$R = r_r(3 - 0.95W - 1.52W^2)$$

The core to core separation is directly related to the degree of fusion by, $$s = 2r_c\sqrt{1 - u^2}$$

where it is assumed that the diameter of the central fibre is equal to the diameter of the outer fibres.

Referring now to FIGS. 33 and 34 there is shown a 'Vycor' former 10 which can be used to hold the central and secondary optical fibres in their correct positions during fusion tapering of a coupler having a number of secondary fibres other than six. This exemplary structure, consisting of one central hole 13 surrounded by eight equally spaced holes at a constant radius, may conveniently be made by drawing down a large drilled glass rod. Other numbers of through holes can be formed for other numbers of secondary fibres. The rod is pulled such that the holes are just large enough to accept a single fibre as shown in FIG. 34. Lengths of fibres are inserted into the former after introducing ethanol into the bore to act as a lubricant. Other readily evaporatable liquids such as acetone may also be found to act as a lubricant.

The assembly is then heated to a temperature sufficient for the glass former to shrink due to surface tension which heating also evaporates the methanol in the bores. Vacuum may be employed at this stage to assist the collapse or to remove air which may become trapped. Heating is continued until a homogenous rod of silica is formed. The glass former is heated around the splice position and is pulled to form a taper. Tapering is continued until the core have reduced in size sufficiently to achieve equal coupling at the preselected wavelengths.

It will be appreciated that the present invention is applicable to forming wavelength flattened couplers in different wavelength windows by choosing the two predetermined wavelengths appropriately.

I claim:

1. A method of forming an optical fibre coupler including the steps of
   a) locating two or more secondary optical fibres about a central optical fibre to form a fibre bundle such that all the secondary fibres are similarly disposed with respect to every one of the other fibres; and
   b) forming a fused, tapered coupler from the fibre bundle the tapering being stopped when the proportions of light coupled out of the central fibre at two distinct predetermined frequencies are first equal.

2. A method as in claim 1 in which the fibres are located relative to each other by respective holes in a cylindrical support member.

3. A method as in claim 2 in which each hole is lubricated with methanol before insertion of the respective fibre.

4. A method as in claim 1 in which the fibre bundle is twisted prior to forming the fused, tapered coupler.

5. A method as in claim 1 or 4 in which the fibres are located relative to each other by a capillary tube.

6. A method as in claim 1, 2, 3 or 4 in which degree of fusion is controlled by controlling the temperature of the fusion to obtain a predetermined tension profile exerted on the fibres during formation of the fused tapered coupler.

7. A method of forming a coupler as in claim 1, 2, 3 or 4 in which there are n secondary fibres, the formation of the coupler providing sufficient fusion between the central fibre and each secondary fibre to provide a 1 to (n+1) coupler at the two predetermined frequencies.

8. A method of forming a coupler as in claim 1, 2, 3 or 4 in which there are n secondary fibres, the formation of the coupler providing sufficient fusion between the central fibre and each secondary fibre to provide a 1 to n coupler at the two predetermined frequencies.

9. A method as in claim 8 in which there are seven standard system matched cladding fibres held in an hexagonal close packed array by a borosilicate capillary prior to fusion of the fibres, the coupler is elongated during fusion at approximately 200 $\mu$m/sec and tension applied to the fibres during formation of the coupler starts at 2 gm reducing linearly to 0.9 gm which latter tension is maintained until the proportions of light coupled out of the central fibre at two predetermined frequencies are first equal.

10. A method as claimed in claim 1, 2, 3 or 4 in which the secondary fibres are equidistantly spaced in a ring about the central fibre.

11. A method as in claim 1, 2, 3 or 4 in which there are an even number of secondary fibres, which are grouped in pairs.

12. A method as in claim 1, 2, 3 or 4 in which the light transmitted by the central fibre is monitored.

13. A method as in claim 1, 2, 3 or 4 in which the light coupled into at least one secondary fibre is monitored.

14. A method as in claim 3 in which the total light coupled into all the secondary fibres is monitored.

15. An optical coupler comprising a fused tapered coupler having a coupling region in which light propagating in a central optical fibre is coupled into two or more secondary fibres, all the secondary fibres being similarly disposed with respect to every one of the other fibres and the coupling region having a length which is the minimum distance for which the coupling ratio at two preselected wavelengths is first equal during formation of the coupler.

16. An optical coupler as in claim 15 in which there are n secondary fibres and the coupler is a 1 to (n+1) coupler.

17. An optical coupler as in claim 15 in which there are n secondary fibres and the coupler is a 1 to n coupler.

18. An optical coupler as in claim 15, 16 or 17 in which the secondary fibres are equidistantly disposed about the central fibre.

19. An optical coupler as in claim 30, 31 or 32 in which there are an even number of secondary fibres which are grouped in pairs.

* * * * *